US011077699B2

(12) United States Patent
Holmes et al.

(10) Patent No.: US 11,077,699 B2
(45) Date of Patent: Aug. 3, 2021

(54) SECURITY ELEMENTS AND METHODS OF MANUFACTURE THEREOF

(71) Applicant: DE LA RUE INTERNATIONAL LIMITED, Basingstoke (GB)

(72) Inventors: Brian Holmes, Basingstoke (GB); Fred Fournier, Basingstoke (GB); Maria King, Basingstoke (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 17/040,289

(22) PCT Filed: Mar. 22, 2019

(86) PCT No.: PCT/GB2019/050830
§ 371 (c)(1),
(2) Date: Sep. 22, 2020

(87) PCT Pub. No.: WO2019/180461
PCT Pub. Date: Sep. 26, 2019

(65) Prior Publication Data
US 2021/0031554 A1 Feb. 4, 2021

(30) Foreign Application Priority Data
Mar. 22, 2018 (GB) ..................................... 1804629

(51) Int. Cl.
B42D 25/328 (2014.01)
G02B 5/18 (2006.01)
(Continued)

(52) U.S. Cl.
CPC ......... B42D 25/328 (2014.10); B42D 25/324 (2014.10); B42D 25/45 (2014.10);
(Continued)

(58) Field of Classification Search
CPC .... B42D 25/328; B42D 25/324; B42D 25/45; B42D 25/23; B42D 25/24; B42D 25/29; B42D 25/373; G02B 5/1857; G02B 5/18
(Continued)

(56) References Cited

U.S. PATENT DOCUMENTS

2010/0084851 A1* 4/2010 Schilling ................ B42D 25/29
283/91

FOREIGN PATENT DOCUMENTS

DE 10 2010 047250 A1 6/2011
EP 0 059 056 A1 9/1982
(Continued)

OTHER PUBLICATIONS

Jul. 2, 2019 International Search Report issued in International Patent Application No. PCT/GB2019/050830.

Primary Examiner — Justin V Lewis
(74) Attorney, Agent, or Firm — Oliff PLC

(57) ABSTRACT

A security element including: a first layer having a first surface; an array of image regions across the first surface arranged along at least a second direction, each region including at least a first image sub-region having an average inclination defining an angle, relative to a plane of the security element, about an image region axis extending along a first direction; a diffractive optically variable effect generating structure provided in or on the first surface across the first image sub-regions, the structure including diffractive elements that extend along a direction within 45° of the first direction, wherein the structure is provided across the first image sub-regions and spatially arranged and/or modulated across the first image sub-regions in accordance with a first image so the first image is displayed by the first image sub-regions in combination at least at a first viewing angle. Also, a method of manufacturing the security element.

18 Claims, 23 Drawing Sheets

(51) Int. Cl.
    *B42D 25/324*    (2014.01)
    *B42D 25/45*    (2014.01)
    *B42D 25/23*    (2014.01)
    *B42D 25/24*    (2014.01)
    *B42D 25/29*    (2014.01)
    *B42D 25/373*    (2014.01)
(52) U.S. Cl.
    CPC ......... *G02B 5/1819* (2013.01); *G02B 5/1847* (2013.01); *G02B 5/1857* (2013.01); *B42D 25/23* (2014.10); *B42D 25/24* (2014.10); *B42D 25/29* (2014.10); *B42D 25/373* (2014.10)
(58) Field of Classification Search
    USPC .................... 283/67, 70, 72, 74, 94, 98, 901
    See application file for complete search history.

(56) References Cited

FOREIGN PATENT DOCUMENTS

| | | |
|---|---|---|
| EP | 0 860 298 A2 | 8/1998 |
| EP | 3 000 613 A1 | 3/2016 |
| EP | 3 184 318 A1 | 6/2017 |
| JP | 2009-265563 A | 11/2009 |
| WO | 83/00659 A1 | 3/1983 |
| WO | 00/39391 A1 | 7/2000 |
| WO | 03/054297 A2 | 7/2003 |
| WO | 03/095188 A2 | 11/2003 |
| WO | 2006/133863 A2 | 12/2006 |

* cited by examiner

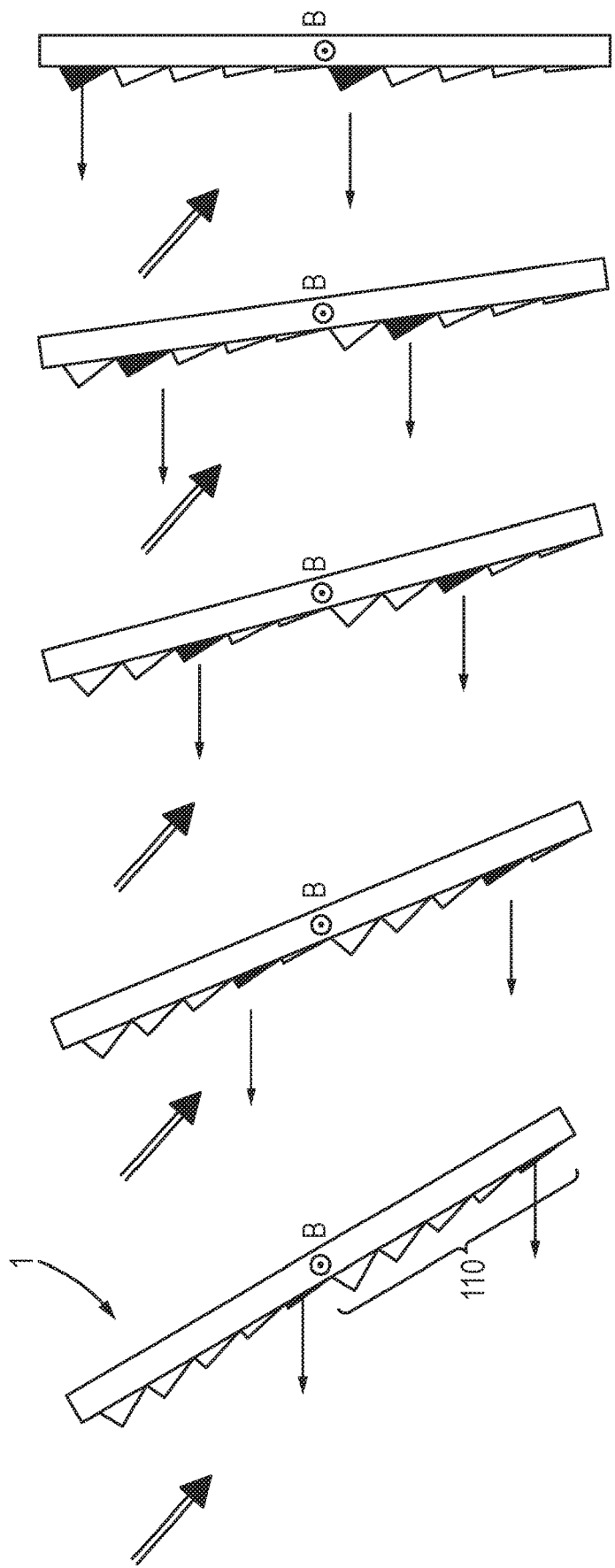

SECURITY ELEMENTS AND METHODS OF MANUFACTURE THEREOF

FIELD OF THE INVENTION

The present invention relates to security elements such as those suitable for use in or on security documents such as banknotes, identity documents, passports, certificates and the like, as well as methods for manufacturing such security elements.

DESCRIPTION OF THE RELATED ART

To prevent counterfeiting and enable authenticity to be checked, security documents are typically provided with one or more security elements which are difficult or impossible to replicate accurately with commonly available means, particularly photocopiers, scanners or commercial printers.

Many conventional security elements utilise diffractive optically variable effect generating relief structures, such as diffraction gratings, to provide an optically variable effect, i.e. an appearance that changes upon tilting or rotation of the device, which cannot be replicated by copying, as with a photocopier or scanner or by printing techniques. Many diffractive devices may have diffraction orders that are far removed from the direction of specular reflection. This is particularly the case for diffractive devices based on specialised diffractive grating structures, specifically with periodicities similar to or less than the mean visible wavelength of white light but operating in the first order of diffraction. Based on typical illumination conditions, i.e. with lighting overhead, such diffractive devices may have fairly narrow or restricted ranges of viewing angles which are not ergonomic to the viewer or observer. For example these devices may only be visible when viewed obliquely (following tilting about the east-west device axis).

It is therefore desirable to provide a security element which overcomes some of the problems associated with conventional diffractive-based security elements and provides for greater control over the replay conditions of diffractive optically variable effect generating relief structures.

SUMMARY OF THE INVENTION

In accordance with first aspect of the invention, there is provided a security element comprising: a first layer having a first surface; an array of image regions across the first surface arranged along at least a second direction (in the plane of the security element), each image region comprising at least a first image sub-region having an average inclination defining an angle, relative to a plane of the security element, about an image region axis extending along a first direction (in the plane of the security element); a diffractive optically variable effect generating structure provided in or on the first surface across the first image sub-regions, the diffractive optically variable effect generating structure comprising diffractive elements that extend along a direction within 45° of the first direction (or at least 45° from the second direction), wherein the diffractive optically variable effect generating structure is provided across the first image sub-regions and spatially arranged and/or modulated across the first image sub-regions in accordance with a first image such that the first image is displayed by the first image sub-regions in combination at least at a first viewing angle.

Security elements are commonly viewed in the same general viewing conditions—illuminated generally from above and viewed around normal to the security element. For optically variable devices, a viewer typically does not rotate a security element very far from this typical viewing position when inspecting the device. For many diffraction structures under such viewing, this can result in diffraction orders rarely being observed where they lay too far from the zero order (i.e. the direction of specular reflection) and therefore too far from normal to the security element. The security element according to the first aspect provides an array of image sub-regions carrying a diffractive optically variable effect generating structure patterned in accordance with a diffractive image, the image sub-regions each being inclined in substantially the same direction relative to the plane of the security element. When the security element is held such that the top of each image region is inclined towards the viewer, the inclination provides that the security element can display diffraction orders further removed from the zero order at more natural viewing angles. By providing that this inclination is performed across multiple image regions, the overall thickness of the security element can be kept low while effectively providing a continuous inclined surface for the diffractive structure. While, in theory, the device could utilise as little as two image regions, preferably at least three image regions, and typically at least 10 image regions or at least 100 image regions, are provided. A larger number of image regions can provide a greater effective area of inclination while minimising the thickness of the security element.

The term image region in the present context refers to an area of the element that will generate a corresponding portion of an image displayed by the security element. Each image region comprises at least a first image sub-region, which provides the means for exhibiting the corresponding portion of a first image. As will be explained below, additional images may be produced by providing each image regions with further sub-regions, which will likewise provide the means for exhibiting the corresponding portion of the further images. For example one image region may be designated as the top left "pixel" of an image displayed by the security element. In which case, at least at one particular viewing angle, the first image sub-region within said image region may exhibit a diffractive effect that provides the top left pixel of this first image. At a second viewing angle, a second image may be displayed, in which case the top left pixel of this second image may again be originated in said top left image region, but this time from a second image sub-region. As mentioned above, the use of multiple image sub-regions within each image region will be discussed in more detail below.

As mentioned above, the diffractive optically variable effect generating structure comprises diffractive elements that extend along a direction within 45° of the first direction. This arrangement ensures that the inclination of the image region has the desired effect on the visible diffraction order as diffraction orders typically lay in a plane perpendicular to the grating elements.

A diffractive optically variable effect generating structure will be understood to be any structure that has an appearance that varies owing to diffraction as the angle of regard changes for a fixed incidence angle or vice versa. Examples of optically variable effects include, in particular, structures which exhibit different diffractive effects upon tilting, e.g. a colour change, as well as structures which exhibit a diffractive effect only at certain viewing angles, i.e. effects which appear to "switch off" as the device is tilted away from a specific viewing angle or viewing angle range. In many cases, optically variable effects will exhibit both a changing diffractive effect and viewing angles at which substantially no diffractive effect is visible.

Typically, the array of image regions, and the sub-regions within them, will be arranged in a regular and/or periodic manner; however, this is not essential. The array of image regions is, however, preferably an array of repeating image regions, with each first image sub-region each contributing to the appearance of the device at substantially the same at least one viewing angle or over substantially the same range of viewing angles. As will be discussed below, this will typically achieved by providing each first image sub-region with substantially the same average inclination.

An average inclination of an image sub-region is considered to be the angle of a plane that approximates the sub-region. In some cases, the sub-regions will in fact be substantially planar, however, in other cases, the sub-regions may be shaped for example, convex. In any case, the average inclination provides for an approximation of how light will interact with that sub-region of the surface and providing that the first image sub-regions have average inclinations that are generally define forward tilt or a tilt towards the viewer (i.e. upper edge of the sub-region being closer to the viewer than the bottom edge when the security element is held perpendicular to the viewer) will ensure that these regions control incident light so as to make diffraction orders further removed from the specular direction more visible. Preferably, the or each sub-region within each image region has an average inclination that defines an angle of between 1° and 70°, preferably between 1° and 50°, more preferably between 5° and 45°, relative to the plane of the security element, about the image region axis extending along the first direction. As mentioned above and discussed in more detail below, some embodiments may comprise multiple sub-regions within each image region, in which case, each sub-region should define an angle within the above ranges relative to the plane of the security element, in the same direction about the image region axis extending along the first direction, i.e. they should all have a forward tilt. However, the precise angles of the forward tilt may be the same or different, depending on the desired effect, as will be described in more detail below.

The desired effect here is that light illuminating the security element at an incidence angle of between 40° and 60° from the vertical is diffracted within 10° of the horizontal. At least one of the sub-regions should satisfy these diffraction criteria when the security element is held substantially vertically so that a clear diffractive effect is visible to a viewer in the most common viewing arrangement. Additional sub-regions may satisfy these criteria, i.e. light diffracted with 10° of the horizontal under illumination at an incidence angle of between 40° and 60° from the vertical when the security element is rotated about its horizontal axis so that the top is closer to the viewer than the bottom, i.e. when the security element is tilted towards the viewer, so as to provide optical variability upon forward tilting. It will be appreciated that the above diffraction criteria may be achieved by appropriately selecting the pitch of the diffractive optically variable effect generating structure and the forward tilt angle of the sub-region as these both contribute to the position of diffraction orders for fixed angle of incoming light and a fixed arrangement of the security element. For example, a diffractive structure with a pitch of 280 nm arranged with elements extending horizontally and on a sub-region with an average inclination of 30° relative to the plane of the security element about the image region axis extending along the first direction, illuminated with light 50° from the vertical, will diffract light in a direction generally along the horizontal. Other suitable pitches and average inclinations may be determined using the diffraction equation $\lambda/d = \sin \alpha + \sin \beta$, where $\lambda$ is the wavelength of light, d is the pitch of the grating structure, and $\alpha$ and $\beta$ are the incidence angle and diffraction angle respectively defined relative to the normal of the sub-region.

In many embodiments, the first direction is substantially perpendicular to the second direction. That is, the first and second directions are orthogonal directions that lay in the plane of the security element.

Preferably, the diffractive optically variable effect generating structure is a diffractive relief structure. The diffractive optically variable effect generating structure may comprise a diffraction grating and the diffractive elements may comprise grating elements of the diffraction grating.

Preferably the diffractive optically variable effect generating structures are dispersive structures, i.e. structures that exhibit a diffractive dispersion effect and, for example, diffract white light incident along a single incidence direction into a range of angles in dependence on wavelength. As will be described below, dispersive structures include conventional first order diffraction gratings, which typically have pitches of more than 600 nm, as well as so-called nano-gratings, which have pitches of 600 nm or less and typically in the range 500 nm to 200 nm, more typically 450 nm to 250 nm. These types of structure are distinct from, for example, zero order diffraction gratings that operate only or primarily in the direction of specular reflection and do not exhibit a plane of diffractive dispersion.

In certain embodiments, at least one of the diffractive optically variable effect generating structures comprises a first order diffractive relief structure, such as a first order diffraction grating, i.e. typically having a pitch of more than 600 nm and more typically 700 nm or more. First order structures typically produce strong and fairly rapid colour variation upon tilting that is strongly aligned with one direction of tilt. Providing conventional diffraction gratings on forwardly inclined sub-regions makes diffractive colours further from the specular direction and higher diffraction orders more readily visible. However, in particularly preferable embodiments, the diffractive structure may have a pitch of 600 nm or less, preferably 550 nm or less, more preferably 500 nm or less, more preferably between 500 nm and 200 nm, most preferably between 450 nm and 250 nm. Other grating parameters include the depth of the diffraction grating and this will typically be between 50 nm and 200 nm, or up to approximately 0.5 times the grating pitch, although this ratio is not critical to the desired effect. For example, a diffraction grating with a pitch of 600 nm or less, commonly referred to as a nano-grating, will typically have a first diffraction order far removed from the zero order. These gratings in particular may not exhibit much of a diffractive effect under a typical viewing arrangement since the viewer will not rotate the device enough to view the first diffraction order. By providing such a diffractive structure on image sub-regions inclined as described above, the first diffraction order is moved closer to normal to the security element and so made more readily visible. These nano-grating structures are particularly preferable since the diffractive effect, for example, around the first order, varies in colour very slowly. This diffractive structure can therefore be used to produce colour images with a relatively invariable diffractive colour. Where, for example, the device is attempting to use the diffractive structure to display an image of a real world object, e.g. a national flag, it may be desirable to provide a diffractive effect that does not vary rapidly in colour so as to match the viewer's colour expectation for that image. In other words, these nano-gratings can provide optically variable effects in which the grating either exhibits no diffractive effect or exhibits a particular colour depending on the viewing angle. While the above structures are particularly preferable, the invention would also be useful for other diffractive structures for making diffractive colours further removed from the specular direction more easily visible.

As mentioned, so-called nano-gratings are advantageous in the context of the present invention since the forward tilt of the sub-regions makes these saturated and slowly varying colours more ergonomically viewable.

Diffractive effects are typically visible in a plane substantially perpendicular to the diffractive elements of the diffractive structure (e.g. perpendicular to grating elements of a diffraction grating) and so the diffractive elements extend along a direction within 45° of the first direction across the first surface to ensure that the inclination of the image region has the desired effect on the visible diffraction order. The inclination has a more pronounced effect on the diffraction orders the more closely the grating elements are aligned with the first direction. Therefore, preferably, the diffractive elements of the diffractive optically variable effect generating structure extend along a direction within 40° of the first direction, preferably within 30° of the first direction, more preferably within 20° of the first direction.

Typically, each first image sub-region has substantially the same average inclination relative to the plane of the security element; however, this is not essential. For example, if the diffractive structure has different characteristics in different image regions so that the first diffraction orders are at different angles, it may be preferable to tailor the inclination of those image regions to the respective grating structures so both first orders are exhibited at substantially the same viewing angle, or to account for the fact that each sub-region will be observed at a very slightly different angle owing to the different position relative to the viewer's eyes. Each inclinations should however be selected so that the angle is defined by rotation in the same direction about each image regions axis. That, is each image region should be inclined in substantially the same direction, if the inclinations are not substantially the same.

While it is possible to space the image regions from one another across the first surface, preferably the image regions are arranged so as to be adjacent or to abut one another on the first surface. For example, the image regions may be arranged so as to define a substantially saw-tooth shaped profile of the first surface in cross-section along the second direction.

While various forms of image regions are anticipated, preferably the array of image regions comprises a one-dimensional array of elongate image regions, each elongate image region extending along the first direction across the first surface, and hence the first image-sub-regions may also be elongate along the first direction across the first surface. Such elongate first image sub-regions will have opposing long edges at different heights owing to the angle defined about the image region axis along the first direction. Since the height variation happens along the short axis of these image regions, they will not significantly increase the thickness of the device. A cross-section along the second direction of each image region may substantially constant along the first direction (ignoring variations resulting from the diffractive relief structure, whose scale will be much smaller than the scale of the image regions).

As mentioned above, the present invention forms at least a first image using the diffractive effect. The diffractive structure is provided across a plurality of the image regions such that there is at least one viewing angle at which the diffractive structures in those first image sub-regions exhibit their diffractive effect to display an image to the viewer. The image may be an icon, such as an alphanumeric character or symbol, a pattern, or a more complex image emulating a picture or portrait. An image will typically require some modulation of the diffractive structure to form the image. For example, the diffractive optically variable effect generating structure may be spatially arranged across the image regions in accordance with the first image. That is, each image region may effectively correspond to a slice of an image to be displayed, and the diffractive structure may be arranged across the image regions to positively or negatively define parts of the corresponding image slice. For example, where the image is an alphanumeric character, the diffractive structure may be arranged to positively define the form of that character, leaving the surrounding background empty. Alternatively, or in addition, the diffractive optically variable effect generating structure may vary in one or more of its pitch, orientation and size, shape and/or profile of the elements of the structure across the image regions in accordance with image information of the first image. Returning to the example of a simple alphanumeric character, the body of the character may be defined by diffractive structure with a first pitch defining a first diffractive colour effect while the surrounding background defined by diffractive structure of a second pitch defining a second diffractive colour effect. It will be appreciated that any image could be formed in this way, including more complex images that use many more modulations of the diffractive structure. While image forming security elements are much preferred, it is also envisaged that alternative security elements could be produced in which the diffractive optically variable effect generating structure is not modulated or spatially arranged across the first image sub-regions in accordance with a first image. For example, the diffractive optically variable effect generating structure could be uniformly provided across the image sub-regions. This may produce a device that diffractively exhibits a single colour, for example. Image information could alternatively be introduced by arranging the image regions to define an image, e.g. to define the outline of an indicium such as a symbol, number or letter.

While embodiments could be provided in which each image region comprises only one image sub-region, e.g. each image region consists of the corresponding first image sub-region, preferably the element will be configured to provide more than one image. Preferably, each image region further comprises at least a second image sub-region having an average inclination defining an angle, relative to the plane of the security element, about the image region axis extending along the first direction, wherein the diffractive optically variable effect generating structure is provided across the second image sub-regions and spatially arranged and/or modulated across the second image sub-regions in accordance with a second image such that the second image, preferably different from the first image, is displayed by the second image sub-regions in combination at least at a second viewing angle, different from the first viewing angle. It will be appreciated that at the first viewing angle, the second optically variable effect will substantially not be exhibited and, at the second viewing angle, the first optically variable effect will substantially not be exhibited. In practice, the first and second optically variable effects will typically be visible over respective only partially or non-overlapping viewing angle ranges. So that both the first and second sub-regions achieve similar effects with regards to the visibility of diffraction orders far removed from the direction of specular reflection, each first and second image sub-region should define an angle, relative to the plane of the security element, in the same direction about the image region axis extending along the first direction. In other words, both the first and second image sub-regions should define a forward tilt (i.e. upper edge of the sub-region being closer to the viewer than the bottom edge when the security element is held perpendicular to the viewer).

In some cases, each first and second image sub-region within each image region may have substantially the same average inclination. For example, one continuous, e.g. planar, surface may define both the first and second image sub-regions. This will typically result in the effective angle of incidence of light being substantially the same in corresponding first and second image sub-regions. So that the first and second images are visible at different viewing angles the diffractive optically variable effect generating structure provided across the second image sub-regions may differ from the diffractive optically variable effect generating structure provided across the first image sub-regions in at least one of the pitch of the structure, the orientation of the structure and the size, shape and/or profile of the elements of the structure such that the second viewing angle is different from the first viewing angle, and wherein typically the first and second viewing angles differ in a direction of rotation of the security element about the second direction. A particularly convenient way of achieving this difference in viewing angle is by providing the diffractive optically variable effect generating structure with a characteristic orientation that is substantially constant across the first image sub-regions and providing the diffractive optically variable effect generating structure with a different characteristic orientation across the second image sub-regions. Since the diffractive effect is typically exhibited in a plane perpendicular to the diffractive elements, this variation in orientation will provide that the two effects are visible at different viewing angles in a direction of rotation of the security element about the second direction, which is particularly advantageous.

While some embodiments will have first and second image sub-regions with the same inclination, preferably each first image sub-region has a different average inclination from the corresponding second image sub-region within each image region. This may involve different amounts of forward tilt, i.e. different angles defined about the first image region axis extending along the first direction, to affect the appearance of the sub-regions as the security element is rotated about its horizontal axis. That is, each first image sub-region may define a different angle, relative to a plane of the security element, about the image region axis extending along the first direction than is defined by the corresponding second image sub-region within each image region, such that the second viewing angle is different from the first viewing angle, and wherein typically the first and second viewing angles differ in a direction of rotation of the security element about the first direction. This can be preferable in particular when nano-gratings are employed since these can have very narrow viewing angle ranges and so multiple forward inclinations can increase the range of viewing angles about the horizontal axis at which a diffractive effect is exhibited. In other embodiments the first and second image sub-regions exhibit different left-right tilts. That is, each first image sub-region may define a different angle, relative to a plane of the security element, about a second image region axis extending along the second direction (e.g. perpendicular to the first direction and in the plane of the security element) than is defined by the corresponding second image sub-region within each image region, such that the second viewing angle is different from the first viewing angle, and wherein typically the first and second viewing angles differ in a direction of rotation of the security element about the second direction. In other words, whereas both the first and second image sub-regions will typically be tilted forwards, preferably by the same amount, they may further exhibit different degrees of left-right tilt so that they direct incident light in different horizontal directions. Preferably, where different left-right tilts are used, each sub-region will define an angle, relative to the plane of the security element, about the second image region axis extending along the second direction of between +45° and −45°, where positive angles represent tilts towards a viewer's right and negative angles representing tilts towards a viewer's left.

In some particularly preferable embodiments, the second image is a perspective-altered version of the first image and preferably the first and second viewing angles are configured such that a stereoscopic image is displayed to a viewer, i.e. by controlling the spacing of the viewing angles in the horizontal direction. As has been mentioned above, the inclination of the respective sets of sub-regions, as well as the characteristics of the diffractive relief structures, may be controlled to configure the viewing angles for the first and second images. By appropriately configuring the viewing angle ranges, each eye of a viewer may be presented with an image from the first and second sets of sub-regions respectively, such that a stereoscopic image is displayed. Alternatively, the sub-regions and corresponding diffractive structures may present a series of images to a viewer so that an animation or image switch is visible upon tilting the device to cycle through the images displayed by those corresponding sub-regions. In some examples, the series of images may each be a different perspective of the same object and the element may be configured such that rotation of the device gives the impression of a rotation of the object depicted in the images.

Preferably, the first and second image sub-regions, and preferably the image region as a whole, each have a size substantially imperceptible to the naked eye (e.g. less than 200 microns along the interlace direction, preferably less than 100 microns, preferably less than 50 microns, preferably less than 20 microns) so that these cannot be resolved by a viewer and so that the corresponding images appear substantially continuous.

The above has focused on cases in which each image region is divided into first and second sub-regions, but it will be appreciated that each image region can be divided into any number of sub-regions, depending on the desired characteristics of the final security element and, in particular, the number of desired different images. Each image region may further comprise a third image sub-region having an average inclination defining an angle, relative to the plane of the security element, about the image region axis extending along the first direction, and wherein the diffractive optically variable effect generating structure is provided across the third image sub-regions and spatially arranged and/or modulated across the third image sub-regions in accordance with a third image such that the third image is displayed by the third image sub-regions in combination at least at a third viewing angle. Similarly, each image region may further comprise a fourth image sub-region having an average inclination defining an angle, relative to the plane of the security element, about the image region axis extending along the first direction, and wherein the diffractive optically variable effect generating structure is provided across the fourth image sub-regions and spatially arranged and/or modulated across the fourth image sub-regions in accordance with a fourth image such that the fourth image is displayed by the fourth image sub-regions in combination at least at a fourth viewing angle. It will be appreciated that the first, second, third and fourth viewing angles are typically mutually different. In such cases, each set of sub-regions may have their own average inclination for controlling the appearance of the device. Preferably, within each image region, the first, second, third and fourth image sub-regions will have mutually different average inclinations. Again, preferably all image sub-regions will be tilted forward, as described above, to more conveniently display diffraction orders distant from the direction of specular reflection. In other words, each image sub-region will define an angle, relative to the plane of the security element, in the same direction about the image region axis extending along the first direction. In some preferable embodiments, each sub-region will have a different degree of left-right tilt. That is, the sub regions will each define a different angle, relative to a plane of the security element, about a second image region axis extending along the second direction, preferably such that the corresponding images are visible at respective viewing angles that differ in a direction of rotation of the security element about the second direction. This arrangement will provide optical variability as the security element is tilted in a left-right direction as a result of the different directions light is directed by the image sub-regions, while still providing the above advantages associated with forward tilting of diffractive structures.

In other preferred embodiments, the sub-regions may vary in both their forward and left-right tilt so as to contribute to optical variability in two orthogonal directions of tilt. For example, each first and second sub-region within each image region may have average inclinations which define the same angle about the image region axis extending along the first direction, but define different angles about the second image region axis extending along the second direction, and each third and fourth sub-region within each image region may have average inclinations which define the same angle about the image region axis (that is different than that defined by the first and second image sub-regions) and define different angles (from each other) about the second image region axis extending along the second direction. This may provide that a first forward tilt angle of the security element, the first and second sub-regions provide the different images visible on left-right rotation, and at a second forward tilt angle of the security element, the third and fourth provide the different images visible on left-right rotation. The sub-regions thereby provide optical variability in two orthogonal directions of tilt.

As mentioned above, where more than two sub-regions per image region are used, all sub-regions will preferably include the diffractive optically variable effect generating structure with diffractive elements that extend along a direction within 45° of the first direction (or at least 45° from the second direction).

In particular in embodiments in which different sub-regions have average inclinations which define different angles relative to the plane of the security element about the image region axis extending along the first direction (i.e. different forward tilts), it is particularly advantageous to use nano-gratings, i.e. gratings having a pitch of 600 nm or less, and in particular to use nano-gratings with a relatively small pitch. For example, preferably the pitch is 450 nm or less, preferably between 450 nm and 250 nm, most preferably between 350 nm and 250 nm. As the pitch of the nano-grating is reduced, the number of diffractive colours that exist in visible space is reduced under typical illumination and viewing configurations. The pitches given above tend towards a scenario in which only blue light is diffracted in a viewing direction. Therefore, devices which use different angles relative to the plane of the security element about the image region axis to provide optical variability when the security element is rotated about the horizontal axis can provide clear image switches in which there is reduced interference between diffracted light from different sub-regions. In other words, since the plane of diffractive dispersion will typically be vertical, different sub-regions configured for different vertical viewing angles could lead to interference between dispersion planes. Since nano-gratings with a pitch less than 450 nm, preferably less than 350 nm, reduce the visible colours in this dispersion plane, the possibility of interference is reduced. A grating of between 300 nm and 250 nm, for example, would restrict viewing colour to mid to deep blue. These small pitch nano-gratings could also be used in security elements in which the inclinations differ about the second image region axis extending along the second direction to reduce optical variability in the vertical direction and ensure that the viewer inspects the device by left-right rotation instead to view the images originating from different sub-regions.

The image regions may be elongate and arranged along one direction, in which case the sub-regions will typically be arranged along that direction, effectively providing interlaced elongate image sub-regions in an analogous fashion to interlaced image strips in lenticular printing. However, particularly where the image regions are arranged in a two-dimensional array, where more than two image sub-regions are provided, the image sub-regions may be arranged in a two-dimensional array within each image region. Here, the sub-regions will effectively be interlaced along two orthogonal directions of the security element. Where the image regions are arranged in a two-dimensional array, each image sub-region may act as a pixel of the corresponding image exhibited at the corresponding viewing angle. Providing the image sub-regions in a two-dimensional array within each sub-region ensures that the "pixels" may be evenly spaced in two orthogonal directions, and the sizer of the sub-regions need not become too small so as to maintain spacing smaller than is perceptible to the naked eye.

Where the image regions define a two-dimensional array of image regions across the first surface, each sub-region within each image region may carry a respective diffractive optically variable effect generating structure defining first and second colour component regions, preferably first, second and third colour component regions, most preferably RBG colour component regions, wherein the diffractive optically variable effect generating structure has different characteristics in the different colour component regions so as to exhibit the different colours of the respective colour components at the corresponding viewing angle associated with each sub-region. For example, a first image sub-region may be divided into three areas, having a first area designated to receive a diffraction grating defining a red colour at the first viewing angle, a second area designated to receive a diffraction grating defining a green colour at the first viewing angle, and a third area designated to receive a diffraction grating defining a blue colour at the first viewing angle. The overall colour appearance of each first sub-region may then be configured by the degree to which these areas receive the diffraction gratings defining those colours. This arrangement enables the construction of full colour images for each of the images corresponding to the arrays of sub-regions.

As mentioned, the diffractive optically variable effect generating structure may be modulated across, for example, the first image sub-regions so that different effects are exhibited in different areas. In one particular example of this, the array of first image sub-regions comprises an array of primary areas and an array of secondary areas, wherein the diffractive optically variable effect generating structure comprises a primary diffractive optically variable effect generating structure provided across the primary areas and a secondary diffractive optically variable effect generating structure provided across the secondary areas, and wherein the primary diffractive optically variable effect generating structure differs from the secondary diffractive optically variable effect generating structure in at least one of the pitch of the structure, the orientation of the structure and the size, shape and/or profile of the elements of the structure such that the primary and secondary areas appear different at least at the first viewing angle. In particular, preferably the primary diffractive optically variable effect generating structure differs from the secondary diffractive optically variable effect generating structure in at least one of the pitch of the structure, the orientation of the structure and the size, shape and/or profile of the elements of the structure such that the primary diffractive optically variable effect generating structure and the secondary diffractive optically variable effect generating structure exhibit their diffractive effects at different viewing angles, typically at different viewing angles in a direction of rotation of the security element about the second direction. This is particularly preferable where only first image sub-regions are provided, or wherein the subsequent image sub-regions differ only by their degree of forward tilt and do not differ in left-right tilt, since this modulation of the grating structure between distinctly different areas can provide a means of introducing optical variability in the left right tilt direction. In particular, here, we have two sets of discrete regions with characteristically different diffractive structures in each that preferably exhibit their effects at different viewing angles. This may achieve, for example, an image, such as an alphanumeric character, that appears as a bright area positively defining the character at one viewing angle in the left-right tilt direction and a bright area negatively defining the character at a second viewing angle in the left-right tilt direction as the two different structures become active and inactive. A particularly convenient way of achieving this is by providing the primary diffractive optically variable effect generating structure with a characteristic orientation that is substantially constant across the primary areas and providing the secondary diffractive optically variable effect generating structure with a different characteristic orientation across the secondary areas. Since the diffractive effect is typically exhibited in a plane perpendicular to the grating elements, this variation in orientation will provide that the two effects are visible at different viewing angles in a direction of rotation of the security element about the second direction, which is particularly advantageous.

In many cases, the first surface will be a reflective first surface to improve the efficiency of the diffractive structures. A reflective surface may be considered one that reflects more than 15%, preferably more than 30%, more preferably more than 50%, most preferably more than 70% of incident light. Alternatively, or in addition, the first surface may be coated in a substantially opaque reflector layer that increases the efficiency of the diffractive structures. What is important is that, for diffractive relief structures, a reflective material follows the diffractive relief in order to increase the reflectivity and hence the efficiency of the diffractive relief structure.

As has been mentioned above, the sub-regions may be provided by substantially planar facets. However, in some embodiments, at least each first image sub-region, comprises a generally convex surface element. A convex surface element acts to direct light with a single incoming incidence angle over a cone of viewing angles and so can provide that the diffractive effect exhibited by the diffractive optically variable effect generating structure is visible over a wider viewing angle range. For example, the element may be convex along the first direction so as to increase the visibility of the diffractive structure along directions of left-right tilt. Preferably each image sub-region, including the second, third and fourth image sub-regions, if provided, comprises a respective generally convex surface element. This may be provided by having each image region define a substantially continuous convex surface element, such as a hemi-cylindrical surface portion, preferably being convex along the first direction. This may provide a smooth and/or continuous image change as the device is tilted, e.g. along the left-right direction, and so improve the replay characteristics of the device. Preferably, the orientation of the diffractive optically variable effect generating structures will be such that the diffractive elements extend within 45° of, preferably within 20° of, preferably substantially along, a convex direction of the or each sub-region. This will act to increase the visibility of the diffractive effect in a direction perpendicular to the direction of diffractive dispersion.

In accordance with a second aspect of the invention there is provided a security document comprising a security element according to the first aspect. The security document may be one of a banknote, a polymer banknote, a cheque, a passport, an identity card, a certificate of authenticity, a fiscal stamp a license, an identification document and a visa.

In accordance with a third aspect of the present invention, a method of manufacturing a security element is provided. The method comprises: providing a first layer having a first surface; forming the first surface of the first layer so as to define an array of image regions across the first surface arranged along at least a second direction, each image region comprising at least a first image sub-region having an average inclination defining an angle, relative to a plane of the security element, about an image region axis extending along a first direction; providing a diffractive optically variable effect generating structure in or on the first surface across the first image sub-regions, the diffractive optically variable effect generating structure comprising diffractive elements that extend along a direction within 45° of the first direction, wherein the diffractive optically variable effect generating structure is provided across the first image sub-regions and spatially arranged and/or modulated across the first image sub-regions in accordance with a first image such that the first image is displayed by the first image sub-regions in combination at least at a first viewing angle.

It will be appreciated that the various preferable features described above with reference to the fourth aspect apply equally to the present method. That is, the method may be adapted to form a security element with any of the above described features.

Preferably, forming the first surface of the first layer so as to define an array of image regions further comprises forming the first surface of the first layer so as to provide the diffractive optically variable effect generating structures in the first surface across the image regions. It is particularly advantageous to simultaneously form the surface inclinations and the diffractive relief structures as this produces an integrally registered structure. Preferably, the first layer is a first layer of curable material and wherein forming the first surface of the first layer comprises casting the first surface of the first layer so as to define the structure and curing the first layer so as to fix the structure in the first surface of the first layer.

Preferably, the method further comprises depositing an opaque reflector layer onto the first surface in at least the image regions. As described above, this increases the efficiency of the diffractive structure.

BRIEF DESCRIPTION OF THE DRAWINGS

Examples of security elements will now be described with reference to the accompanying drawings, in which:

FIG. 15D shows the security element as it is being viewed at different viewing angles.

DETAILED DESCRIPTION

A security element according to the first aspect of the invention will now be described with reference to FIGS. 1 to 4.

Figure 1:
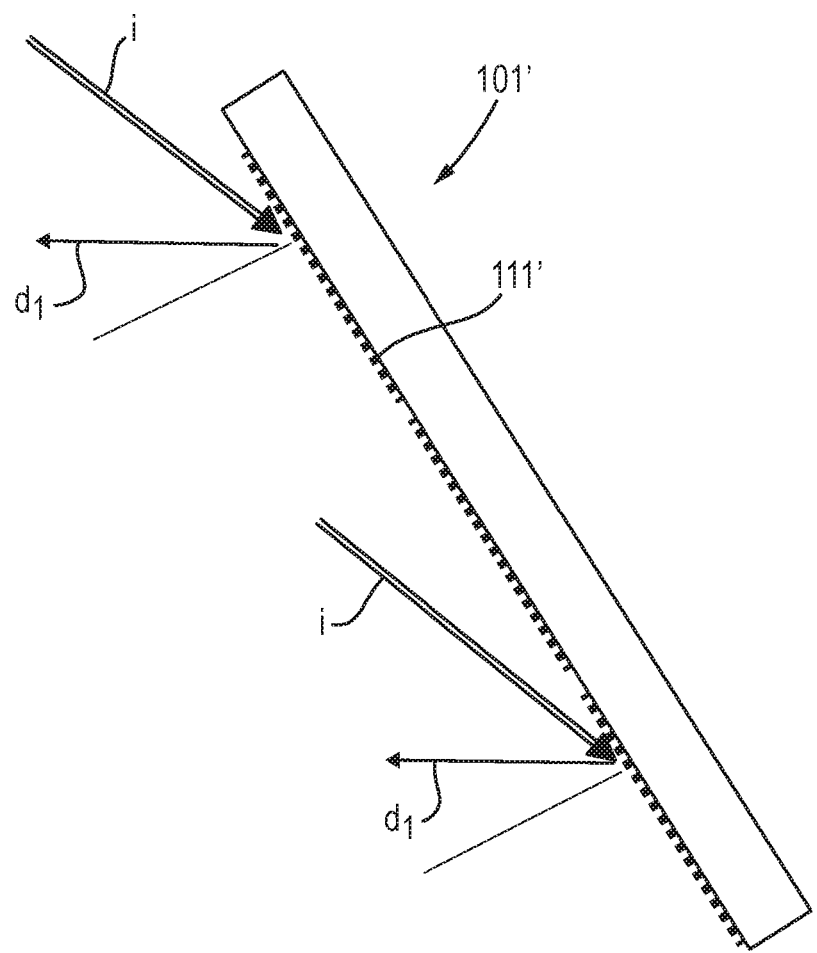
FIG. 1 shows a nano-grating not according to the invention in cross-sectional view.

FIG. 1 shows a security a security element 101' not according to the invention. The security element comprises a nano-grating 111', i.e. a grating having a pitch of 600 nm or less, arranged with the grating elements extending substantially horizontally such that the diffraction plane is substantially vertical. Such gratings typically have a first diffraction order $d_1$ that is far removed from the zero order, i.e. the direction of specular reflection. Therefore, as shown in FIG. 1, in order for a viewer to see the first diffraction order, the security element has to be rotated about its horizontal axis so that the top edge of the security element is closer to the viewer than the bottom edge. This viewing arrangement is inconvenient for a viewer and may even lead to the viewer not observing the diffractive effect.

Figure 2:
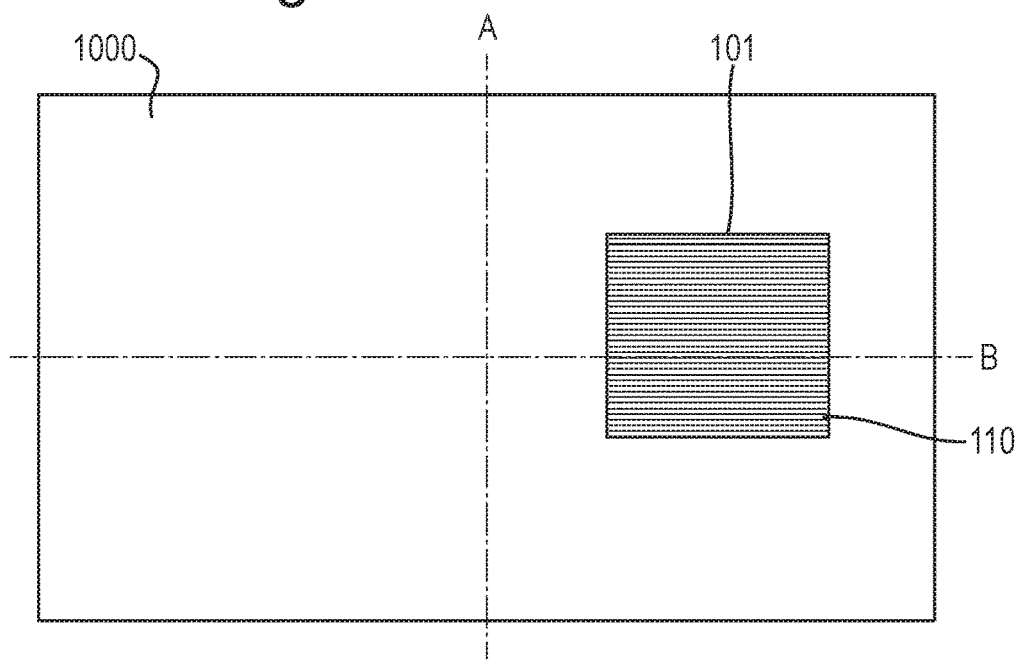
FIG. 2 shows, schematically, a security document including an embodiment of a security element.

FIG. 2 shows a security document 1000, in this case a banknote, carrying a security element 101 according to the invention. The security document has a short axis A and a long axis B perpendicular to the short axis. The security document is observed during normal viewing with the short axis A being substantially vertical and the long axis B being substantially horizontal. The security element has a first surface that faces away from the security document. This first surface is made up of an array of image regions 110, in this case elongate image regions, each elongate image region extending in a first direction, i.e. horizontally along the direction of the axis B. The array of elongate image regions are arranged so as to repeat along a second direction along the surface, i.e. vertically along the direction of axis A, the image regions repeating so as to provide the height of the security element.

Figure 3:
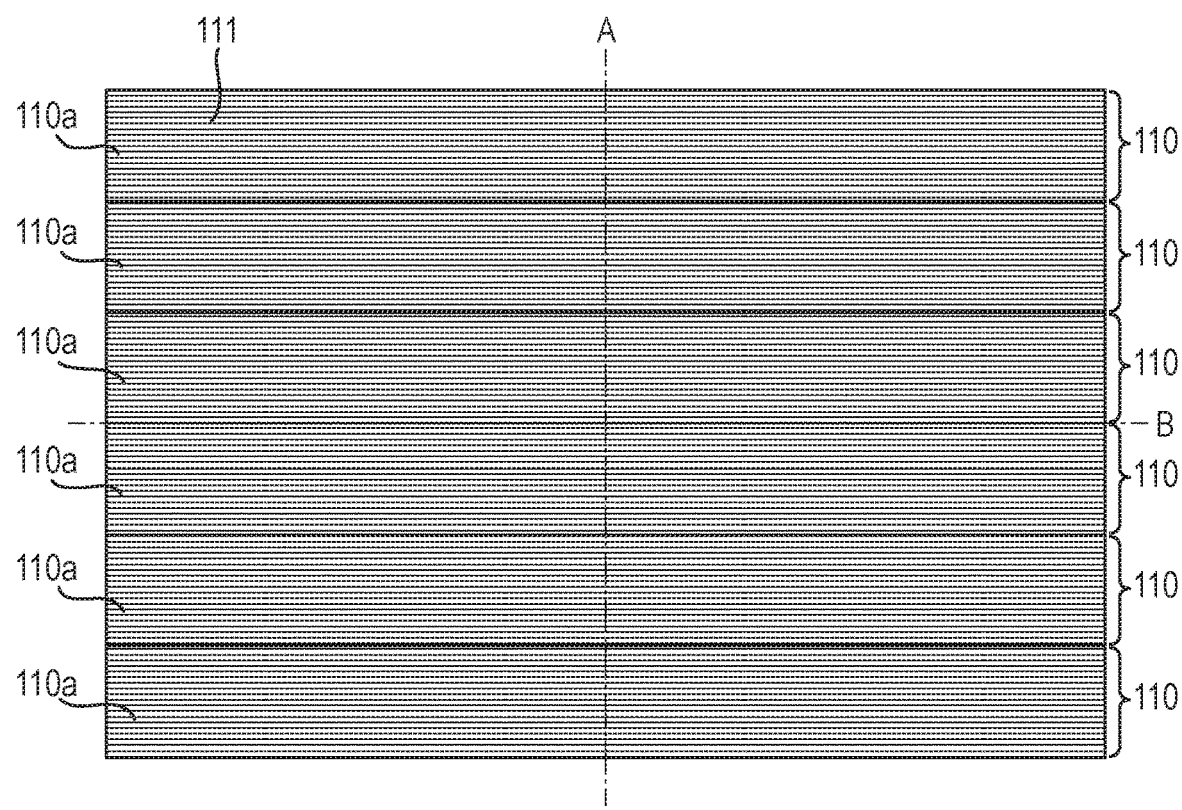
FIG. 3 shows, schematically, an enlarged portion of the security element of the embodiment of FIG. 2 including the diffractive structures on the surface.

FIG. 3 shows a plan view of a small portion of the security element. Specifically, this shows a portion of six image regions 110. The present embodiment is configured to exhibit only a first image from the diffractive structure arranged across the image regions and, as such, as shown in this Figure, each image region consists of a first image sub-region 110a that extends horizontally along the direction of axis B, this direction of each first image sub-region being the "image region axis" referred to above in the context of the first aspect of the invention. The first image sub-regions 110a repeat along the direction of axis A, with each first image sub-region being adjacent to the first image sub-region in the neighbouring image region. Each first image sub-region 110a carries a nano-grating structure 111 having a pitch of 600 nm or less. The nano-grating structure is disposed across the array of first image sub-regions 110a in accordance with an image to be displayed. The grating 111 in this embodiment is spatially arranged in accordance with the image, thereby defining the image against a blank background. However, alternatively, or in addition, the grating could be modulated, e.g. by varying the pitch, in accordance with image information of the image. In this embodiment, the nano-grating 111 is arranged such that the grating elements extend horizontally across the device, i.e. in the direction across the surface corresponding to axis B; however, as will be described below, this is not essential.

Figure 4:
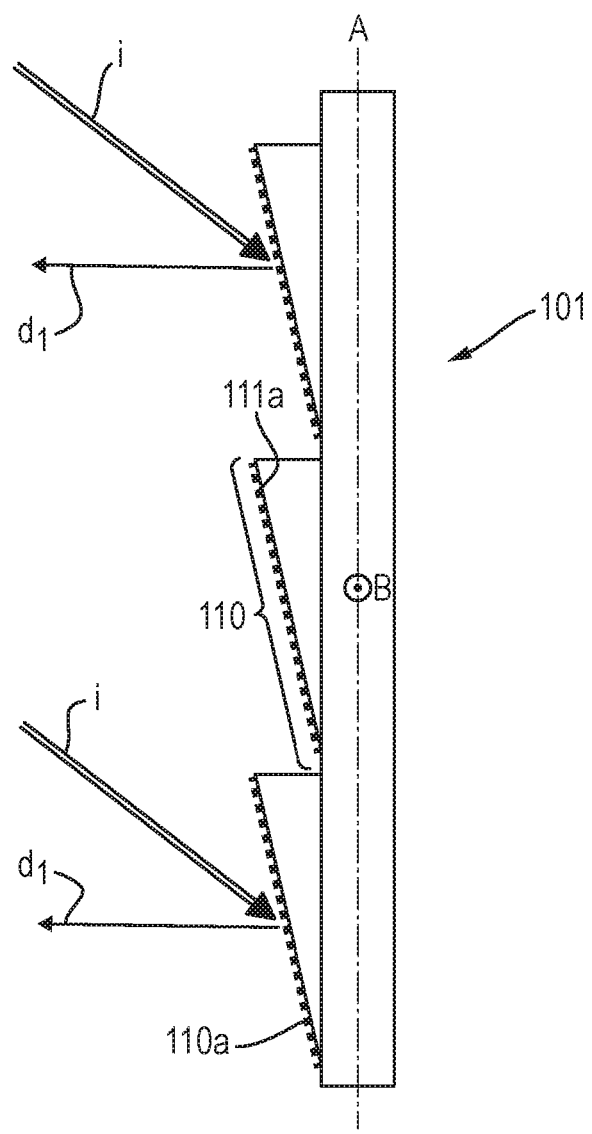
FIG. 4 shows, schematically, a cross-sectional view of the security element of the embodiment of FIG. 2.

FIG. 4 shows a cross-section through a portion of the security element taken along the direction of axis A. As shown in FIG. 4, each first image sub-region 110a has an average inclination defining an angle, relative to a plane of the security element 101, about an image region axis that extends along the direction of axis B. That is, the top of each first image sub-region is inclined towards a viewer such that, when the security element is viewed by a viewer along a direction normal to the plane of the security element, the top of each first image sub-region 110a is closer to the viewer than the bottom of the corresponding first image sub-region 110*a*. FIG. 4 shows the effect this has on the direction of light diffracted into the first diffraction order as compared with FIG. 1. Specifically, the inclination of the first image sub-regions 110*a* provides that light diffracted into the first diffraction order when the element is illuminated from the same angle as in FIG. 1 is directed towards the viewer such that the viewer can view the first diffraction order without resorting to a steep viewing arrangement. For example, the pitch of the diffraction grating may be 280 nm, and the sub-region may have a forward tilt of 30° relative to the plane of the security element, such that light incident along a direction of 50° from the vertical results in blue light (i.e. 400 nm wavelength) being diffracted generally along the horizontal direction towards a viewer.

Figure 5:
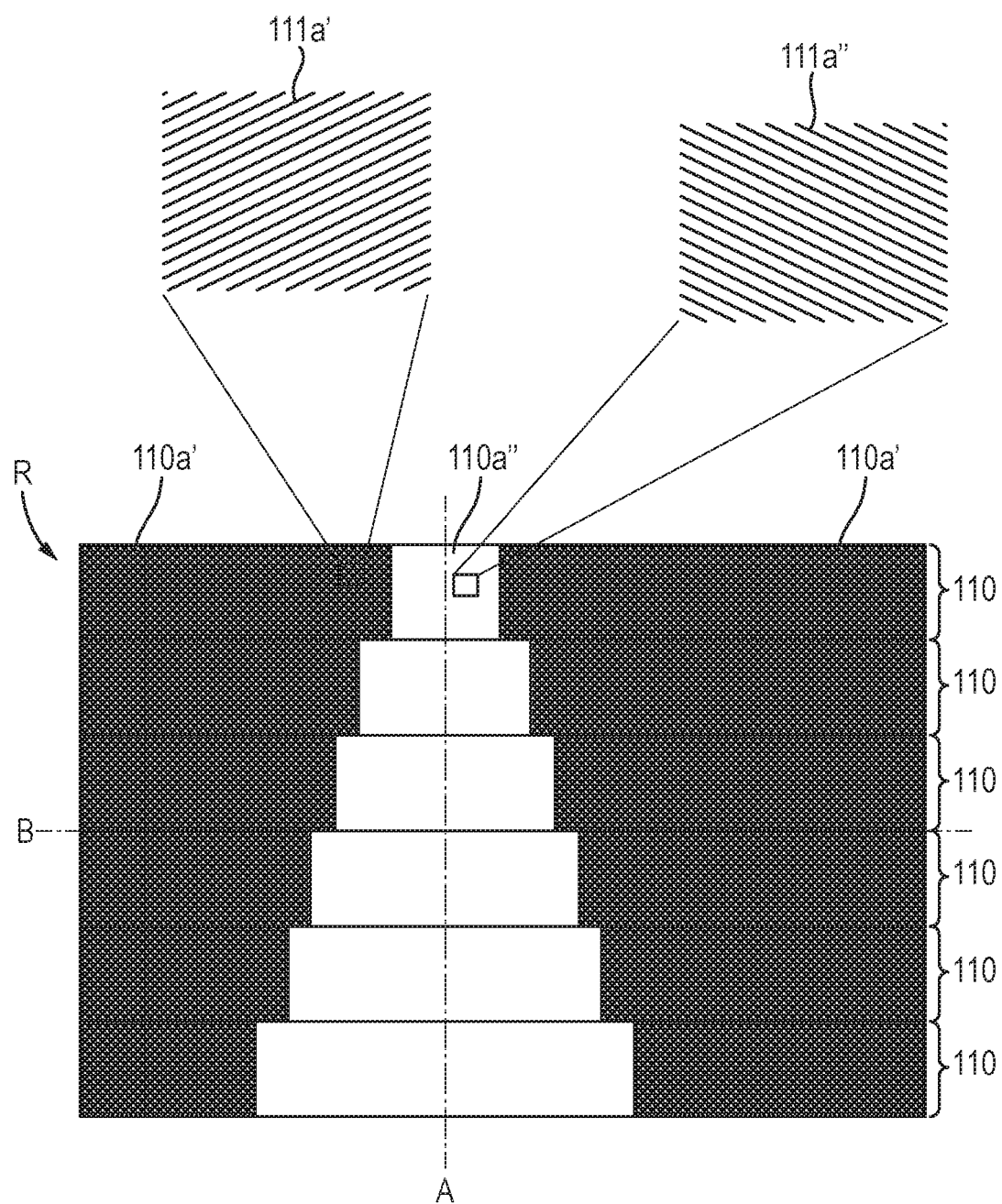
FIG. 5 shows, schematically, an enlarged portion of a security element according to another embodiment.

FIG. 5 shows a region R of another embodiment, in plan view, demonstrating an alternative arrangement of grating structure across the first image sub-regions 110*a* of a device having the same arrangement of first image sub-regions described above with respect to FIGS. 2 to 4. In this embodiment, the first image sub-regions 100*a* are again elongate, extending along the direction of axis B and repeating along the direction of axis A, with each first image sub-region being tilted towards the viewer as described above. The first image sub-regions comprise primary and secondary areas 110*a*', 110*a*". The primary and secondary areas are arranged across the first image sub-regions 110*a* so that the primary areas 110*a*' negatively define an image, in this case an icon such as an alphanumeric character (shown schematically as a triangle), while the secondary areas 100*a*" provide the foreground, thereby effectively positively defining that same image. FIG. 5 shows that in the primary areas 110*a*', the nano-grating 111*a*' is provided with a first orientation. Specifically, the grating is at an angle of less than 45° relative to the horizontal plane, i.e. the direction across the surface of the element corresponding to axis B, in an anti-clockwise direction. In this embodiment, the grating in the primary area has constant pitch, etc. so as to be substantially uniform in appearance; however the pitch could also vary to provide multiple colours. The secondary regions 110*a*" comprise nano-grating 111*a*" with a second orientation. Specifically, the grating is at an angle of less than 45° relative to the horizontal plane, i.e. the direction across the surface of the element corresponding to axis B, in a clockwise direction.

Figure 6A:
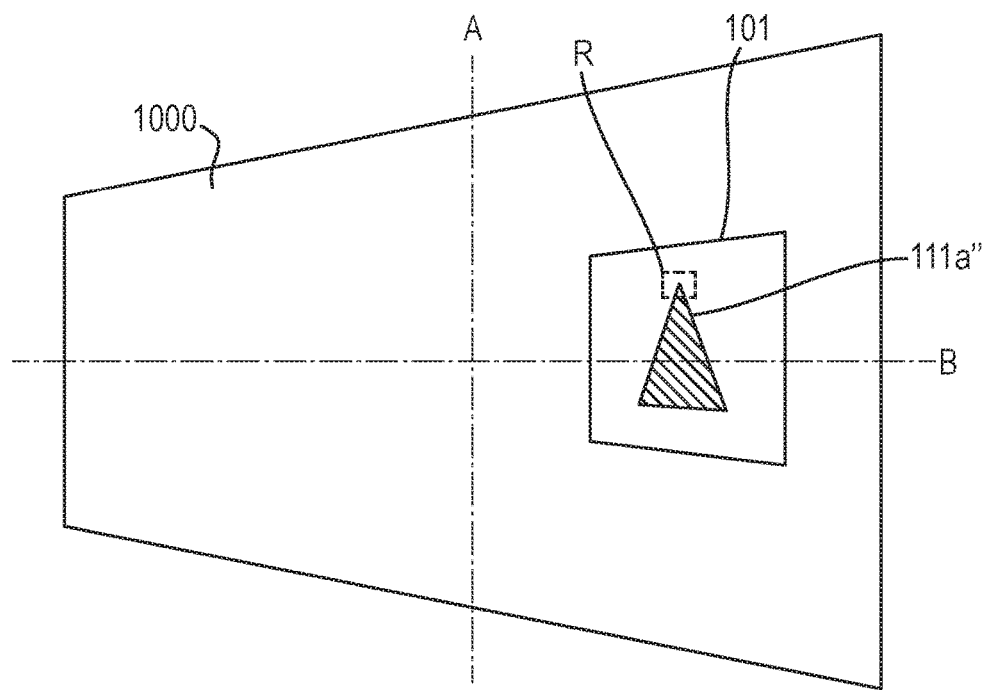
FIGS. 6A and 6B show, schematically, a security document including the security element of the embodiment of FIG. 5 at first and second viewing angles.
Figure 6B:
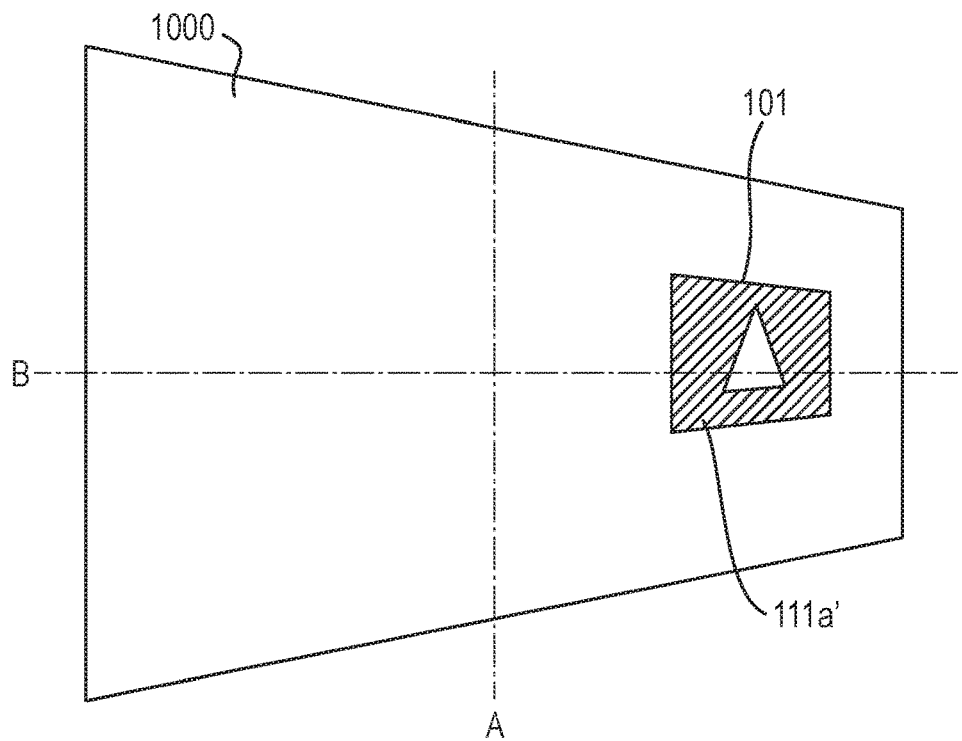

FIGS. 6A and 6B illustrate the appearance of a security document including the security element described above. FIG. 6A shows the security document 1000 rotated about axis A such that the right-hand side of the document is closer to the viewer than the left-hand side. Hence, when viewed in a light source positioned generally overhead, the nano-grating in the secondary areas 110*a*" exhibits its diffractive effect, while the nano-grating in the primary areas 110*a*' does not. This is owing to the different orientations of those gratings affecting the angle of the diffractive plane. The viewer therefore sees the image defined by the secondary areas 110*a*", and specifically sees this image positively defined by a bright diffractive area.

FIG. 6B shows the security document 1 rotated about axis A such that the left-hand side of the document is closer to the viewer than the right-hand side. Hence, when viewed in a light source positioned generally overhead, the nano-grating in the primary areas 110*a*' exhibits its diffractive effect, while the nano-grating in the secondary areas 110*a*" does not. Now the viewer has exhibited a switch so that the image defined by the primary areas and is negatively defined by a bright diffractive background.

Rotation of the security document about axis B while in either viewing arrangement described above would cause the grating to cycle through their diffractive effect. However, since nano-gratings vary only very slowly in colour as compared with coarser pitch diffraction gratings, the security element may maintain substantially the same colour.

Figure 7:
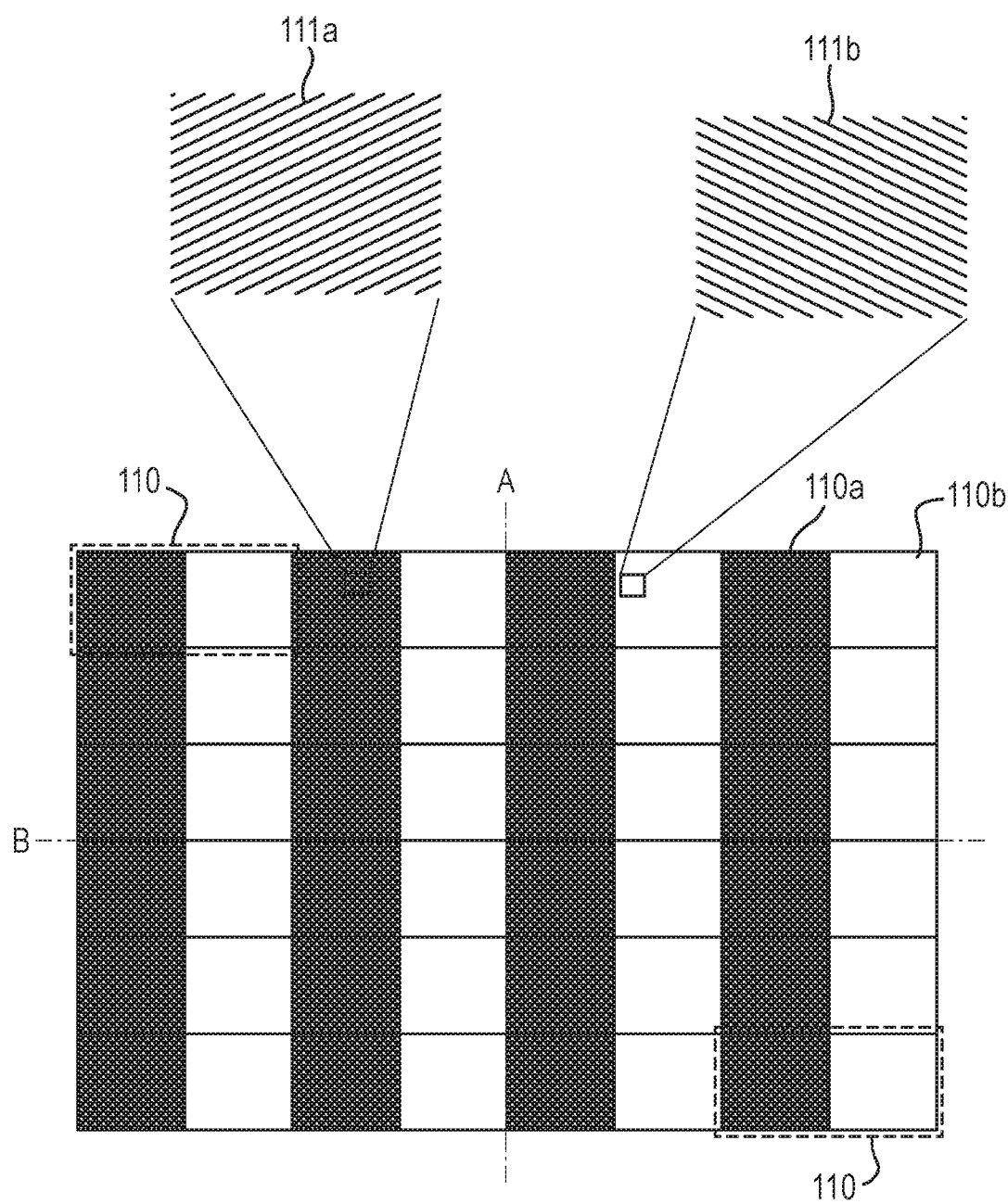
FIG. 7 shows, schematically, an enlarged portion of a security element according to another embodiment

Another embodiment will now be described with reference to FIG. 7. In this embodiment, there is provided a two-dimensional array of image regions 110, the image regions repeating along both the direction of axis A and the direction of axis B. Each image region 110 comprises a first image sub-region 110*a* and a second image sub-region 110*b*. In this embodiment, within each image region 110, the first image sub-region 110*a* and the second image sub-region 110*b* are provided by the same generally planar facet so as to have the same average inclination, i.e. a forward inclination, without any inclination either left or right. Each image region 110 is essentially divided in half, with the left half forming the first image sub-region 110*a* and the right half defining the second image sub-region 110*b*. A nano-diffraction grating 111*a*, 111*b* is provided across the resulting array of first and second image sub-regions 110*a*, 110*b*. In this embodiment, the grating is provided in each of the first image sub-regions 110*a* with a first orientation. Specifically, the grating is at an angle of less than 45° relative to the horizontal in an anti-clockwise direction. Further, the grating is provided in each of the second image sub-regions 110*b* with a second orientation. Specifically, the grating is at an angle of less than 45° relative to the horizontal in a clockwise direction. In this embodiment, the grating may be provided in or modulated across the first and second image sub-regions in accordance with completely separate first and second images. For example, each first image sub-region 110*a* may act as one pixel in a final first image and each second image sub-region 110*b* act as one pixel in a final second image. When the security element is arranged such that the grating in the first image sub-regions 110*a* exhibits its effect, the viewer will see only the "pixels" defining the first image and when the security element is arranged such that the grating in the second image sub-regions 110*b* exhibits its effect, the viewer will see only the "pixels" defining the second image. Owing to the way the image regions 110 are interlaced along both directions A and B on a scale imperceptible to the naked eye, the viewer will see these two images appear in the same region of the security element. The images therefore need not be related and could, for example, be two different and unrelated alphanumeric characters, symbols or patterns.

Figure 8A:
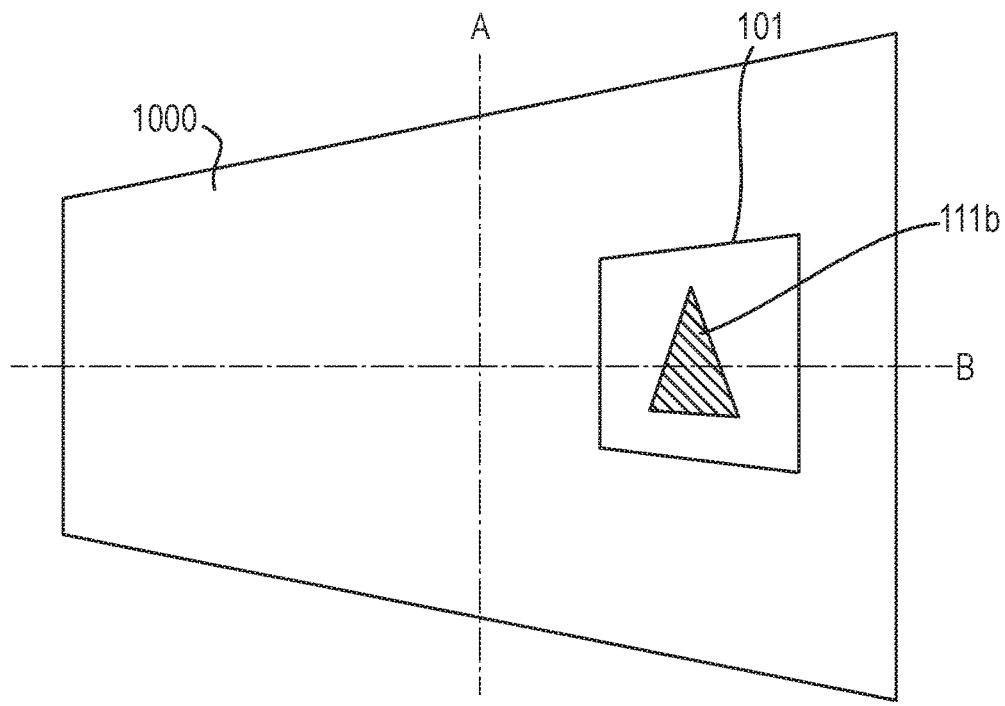
FIGS. 8A and 8B show, schematically, a security document including the security element of the embodiment of FIG. 7 at first and second viewing angles.
Figure 8B:
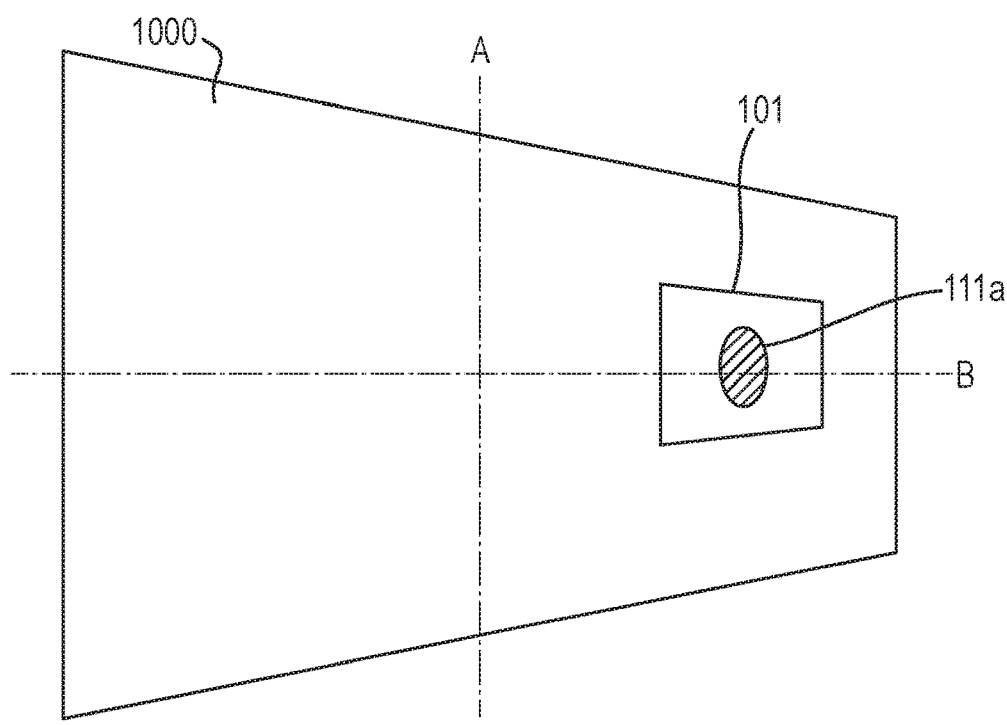

FIGS. 8A and 8B illustrate the appearance of this security element. FIG. 8A shows the security document 1000 rotated about axis A such that the right-hand side of the document is closer to the viewer than the left-hand side. Hence, when viewed in a light source positioned generally overhead, the nano-grating 111*b* in the second image sub-regions 110*b* exhibits its diffractive effect, while the nano-grating 111*a* in the first image sub-regions 110*a* does not. This is owing to the different orientations of those grating affecting the angle of the diffractive plane. The viewer therefore sees the image defined by second image sub-regions 110*b*, and specifically sees a second image, in this case schematically represented as a triangle.

FIG. 8B shows the security document 1 rotated about axis A such that the left-hand side of the document is closer to the viewer than the right-hand side. Hence, when viewed in a light source positioned generally overhead, the nano-grating 111*a* in the first image sub-regions 110*a* exhibits its diffractive effect, while the nano-grating in the second image sub-regions 110*b* does not. Now the viewer sees a different image, this time defined by the first image sub-regions 110*a* and shown schematically as a circle. It will be noted that these two unrelated images may be exhibited in the same area of the security element.

Again, rotation of the security document about axis B while in either viewing arrangement described above would cause the grating to cycle through their diffractive effect. However, since nano-gratings vary only very slowly in colour as compared with coarser pitch diffraction gratings, the security element may maintain substantially the same colour.

In the above embodiments, gratings of constant parameters, e.g. pitch, are used; however, it will be appreciated that the grating parameters could further be modulated within the first and/or second image sub-regions 110 and/or within the primary and secondary regions 110*a*', 110*a*" in order to produce variation in the final optical effect, e.g. to provide colour variation to the final image.

Security elements as described above may be manufactured as will be described with reference to FIGS. 9A to 9D.

Figure 9A:
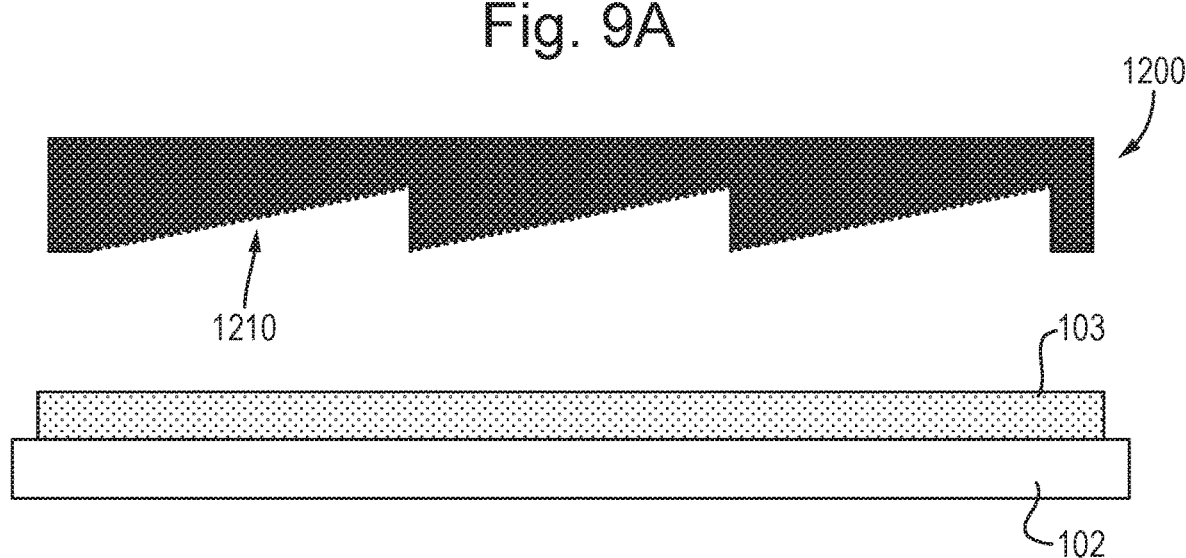
FIGS. 9A to 9D show, schematically, four different stages during a method of manufacture of the security element of the embodiment of FIG. 2.

The surface structure, including both the image sub-region inclinations and the diffractive relief structures across the image sub-regions 110 can be provided in a master die, for example by using e-beam lithography. Such a master die 1200 is shown in FIG. 9A including a negative of the desired relief structure 1210. The surface structure in the die 1210 defines negatives of array of image regions 110, including the image sub-regions 110*a* and grating structure 111. FIG. 9A also shows a transparent support layer 102, which may be a layer of the final security element 101. On the surface of the transparent support layer 102 is provided a UV curable material 103. In alternative embodiments, the curable material 103 is directly applied onto the security document and the surface relief subsequently formed in the surface of the curable material while on the security document. This alternative requires no subsequent transferal of the security element onto a security document. In yet further alternatives, the security element may be formed directly into the substrate of the security document by using a formable polymer substrate in place of the UV curable material 103.

Figure 9B:
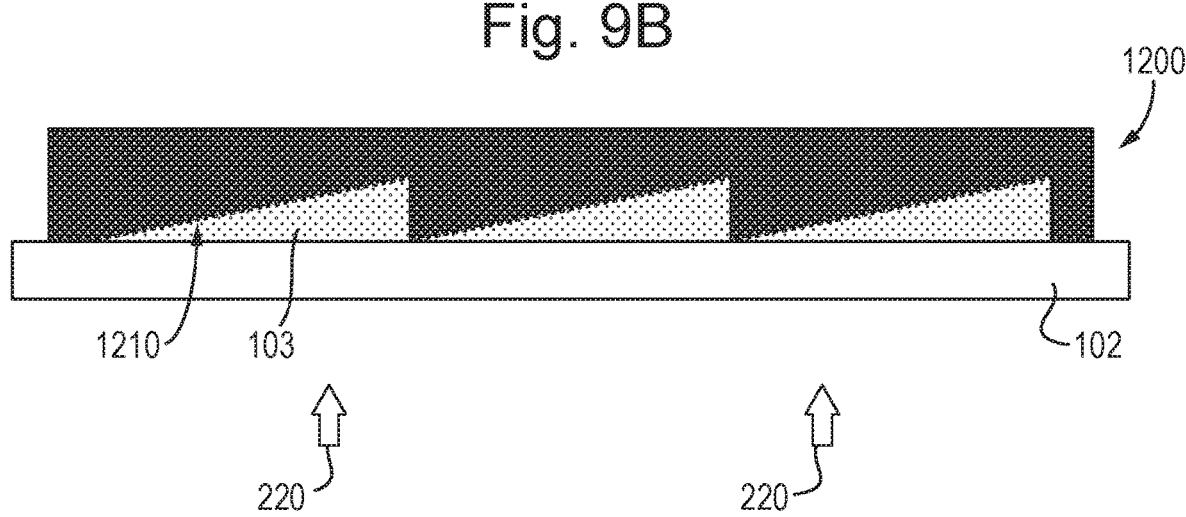

FIG. 9B shows the die 1200 being brought into contact with the curable material 103 so as to form the curable material into the desired surface shape, i.e. into a series of image regions with diffraction grating structures arranged across corresponding image sub-regions. FIG. 9B also illustrates that the curable material 103 is exposed to UV radiation 220 through the transparent support layer 102, while in contact with the die 1200.

Figure 9C:
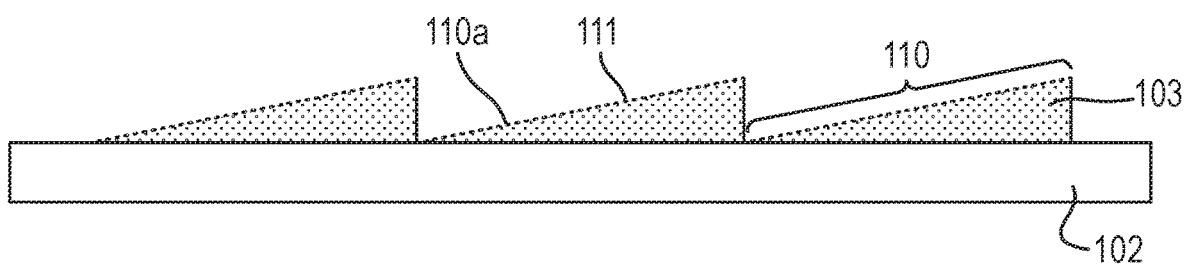

FIG. 9C shows the cured curable material 103, which corresponds to the first layer of the security element discussed above, after separation from the die 1200. The cured curable material now exhibits a plurality of image regions 110 with the desired inclination of the sub-regions and carrying a grating structure 111, substantially as described above in FIGS. 2 to 4.

Figure 9D:
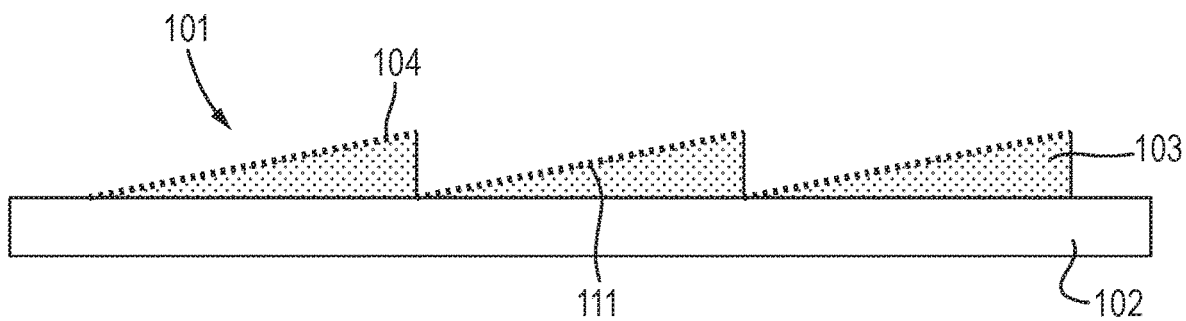

FIG. 9D shows a cross section of the final security element 101 after the surface has been coated in a reflection enhancing layer 104, in this case a conformal coating of an opaque metal. The reflection enhancing layer may be formed on the surface of the security element using a vapour deposition process, for example. As can be seen here, the security element comprises the layer of cured curable material 103 whose surface carries array of image regions 110, with first image sub-regions 110*a* each inclined in the same direction and each carrying portion of a nano-grating structure 111.

A further embodiment of the invention will now be described with reference to FIGS. 10A to 10D.

In the above embodiments, each image region has comprised only image sub-regions having the same inclination (or average inclination). However, particularly advantageous embodiments provide different sub-regions with different inclinations so as to control the effective angle of incidence of light on the surface in the different image sub-regions.

Figure 10A:
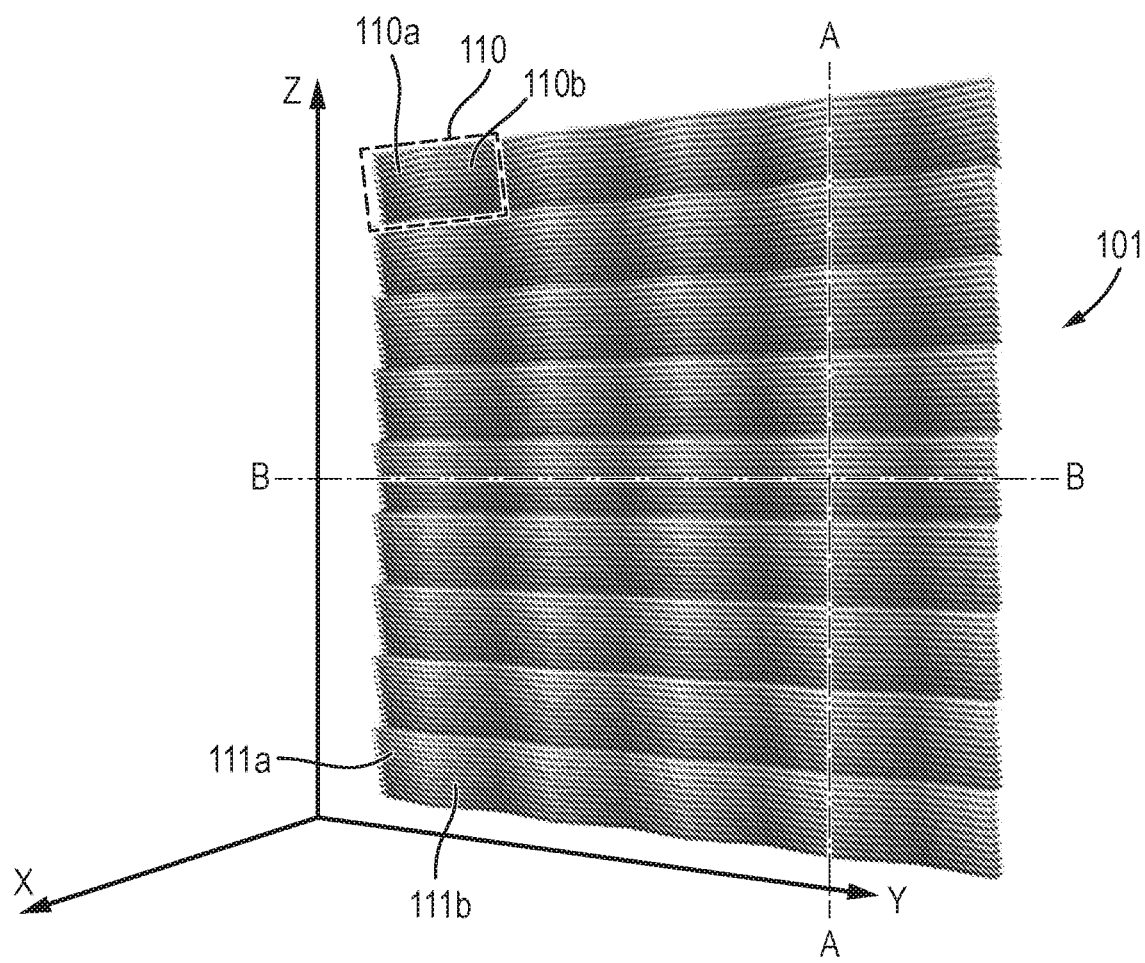
FIGS. 10A to 10D show, schematically, another embodiment of a security element in a perspective view, first and second cross-sections and a variant of the diffraction grating that may be provided across the security element respectively.
Figure 10B:
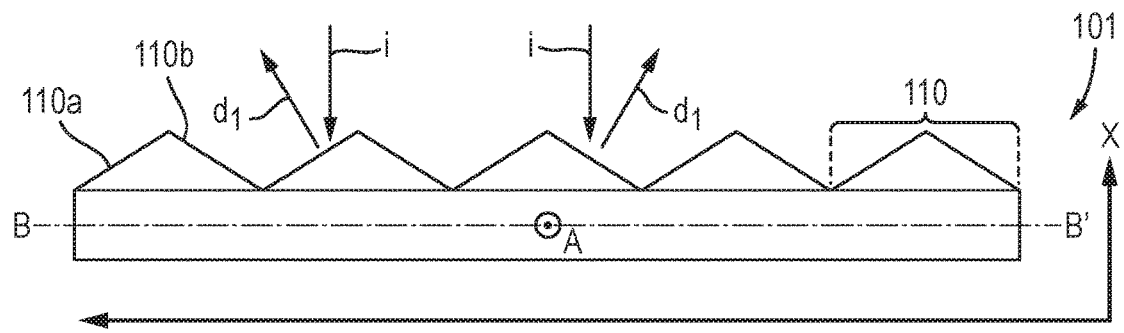
Figure 10C:
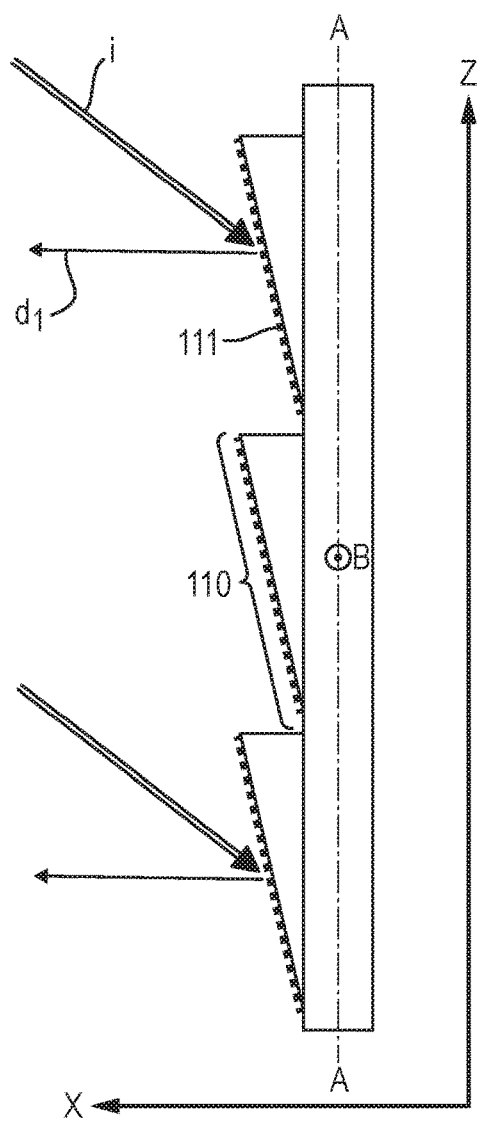

FIG. 10A shows part of the surface of the security element 101 in a schematic perspective view, with FIGS. 10B and 100 showing partial horizontal and vertical cross-sections along the directions B and A in FIG. 10A respectively. As with the above embodiments, the terms vertical and horizontal refer to how the security element is held when being viewed by a viewer. That is, the plane of the security element is arranged generally vertically, with the viewer viewing the security element along a direction substantially perpendicular to the plane of the security element. The surface of the security element is arranged to define a two-dimensional array of image regions 110. The image regions 110 are generally rectangular in shape and repeat in the horizontal and vertical directions of the device, referred to as the first and second directions above, respectively. Each image region 110 defines first and second image sub-regions 110*a* and 110*b*. These image sub-regions 110*a*, 110*b* have a generally square or rectangular footprint on the surface of the security element, with the first image sub-region 110*a* forming the left half of the corresponding image region 110 and the second image sub-region 110*b* forming the right half of the corresponding image region 110. The first image sub-regions and the second image sub-regions are thereby interlaced along the horizontal direction B and, in this case, the repeat distance is on a scale not discernible to the naked eye. These image sub-regions 110*a*, 110*b* also carry corresponding diffraction gratins 111*a*, 111*b* for defining first and second images. The diffraction gratings are shown schematically in the Figures as being provided uniformly across the image sub-regions 110*a*, 110*b*; however, it will be appreciated that some modulation or arrangement of the grating will typically be employed to define the images across the image sub-regions, as has been described above.

Both the first and second image sub-regions 110*a* and 110*b* are tilted forwards, and in this embodiment, they both have the same degree of forward tilt. That is, each first image sub-region 110*a* has an average inclination defining an angle, relative to a plane of the security element 101, about an image region axis that extends along the direction B, and each second image sub-region 110*b* has an average inclination defining substantially the same angle, relative to a plane of the security element 101, about the image region axis that extends along the direction B. Therefore, when arranged for viewing, the top of each first and second image sub-region 110*a* 110*b* will be inclined towards a viewer such that, when the security element is viewed by a viewer along a direction normal to the plane of the security element, the top of each first and second image sub-region 110*a* 110*b* will be generally closer to the viewer than the bottom of the corresponding first or second image sub-region 110*a*, 110*b*. FIG. 100 shows this more clearly in a vertical cross-section, showing three image regions 110 along the vertical direction and illustrating the effect the inclination has on the direction of light diffracted into the first diffraction order.

In addition to each first and second image sub-regions 110a and 110b having a forward tilt, they additionally have some lateral tilt. In particular, each first image sub-region 110a is tilted about a vertical axis, i.e. an axis along the direction A, towards the viewer's left, while each second image sub-region 110b is tilted about the vertical axis towards the viewer's right. This is more clearly shown in the horizontal cross-section of FIG. 10B, which illustrates that the first and second image sub-regions 110a, 110b are tilted away from each other. This lateral tilt provides that light incident along a single direction i will be guided in different lateral directions by the inclinations of the sub-regions. This therefore provides that light diffracted from the first and second sub-regions 110a, 110b will be diffracted along different horizontal directions. For example, the first sub-region 110a may define an angle of −30° and the second sub-region define an angle of +30°, i.e. the first sub-region being inclined by 30° towards the viewer's left and the second sub-region being inclined by 30° towards the viewer's right, to provide horizontal separation of the diffractive effects.

The diffraction gratings 111a, 111b provided across the first and second image sub-regions 110a, 110b have the same orientation. That is, all grating elements extend along the direction B across the surface corresponding to the horizontal direction. That is, the grating elements extend along a direction perpendicular to the vertical axis along direction A. This ensures that the plane of diffractive dispersion is substantially vertical for both diffraction gratings. However, while the diffraction gratings 111a, 111b have the same orientation, the inclination of the first and second image sub-regions 110a, 110b provides that the diffraction orders of these gratings are separated from one another in a horizontal direction. A viewer may therefore rotate the security element about the vertical axis A and view the first and second images, generated by the diffraction gratings 111a, 111b provided across the first and second image sub-regions 110a, 110b, in sequence. As with the embodiment shown in FIGS. 7 and 8, the two-dimensional arrangement of the image sub-regions provides that each first image sub-region effectively acts as a corresponding pixel in the first image and each second image sub-region region effectively acts as a corresponding pixel in the second image, and since the repeat distance of the sub-regions along the horizontal direction is on a scale not discernible to the naked eye, a viewer is able to see two entirely different images displayed in the same region of the security element.

Figure 10D:
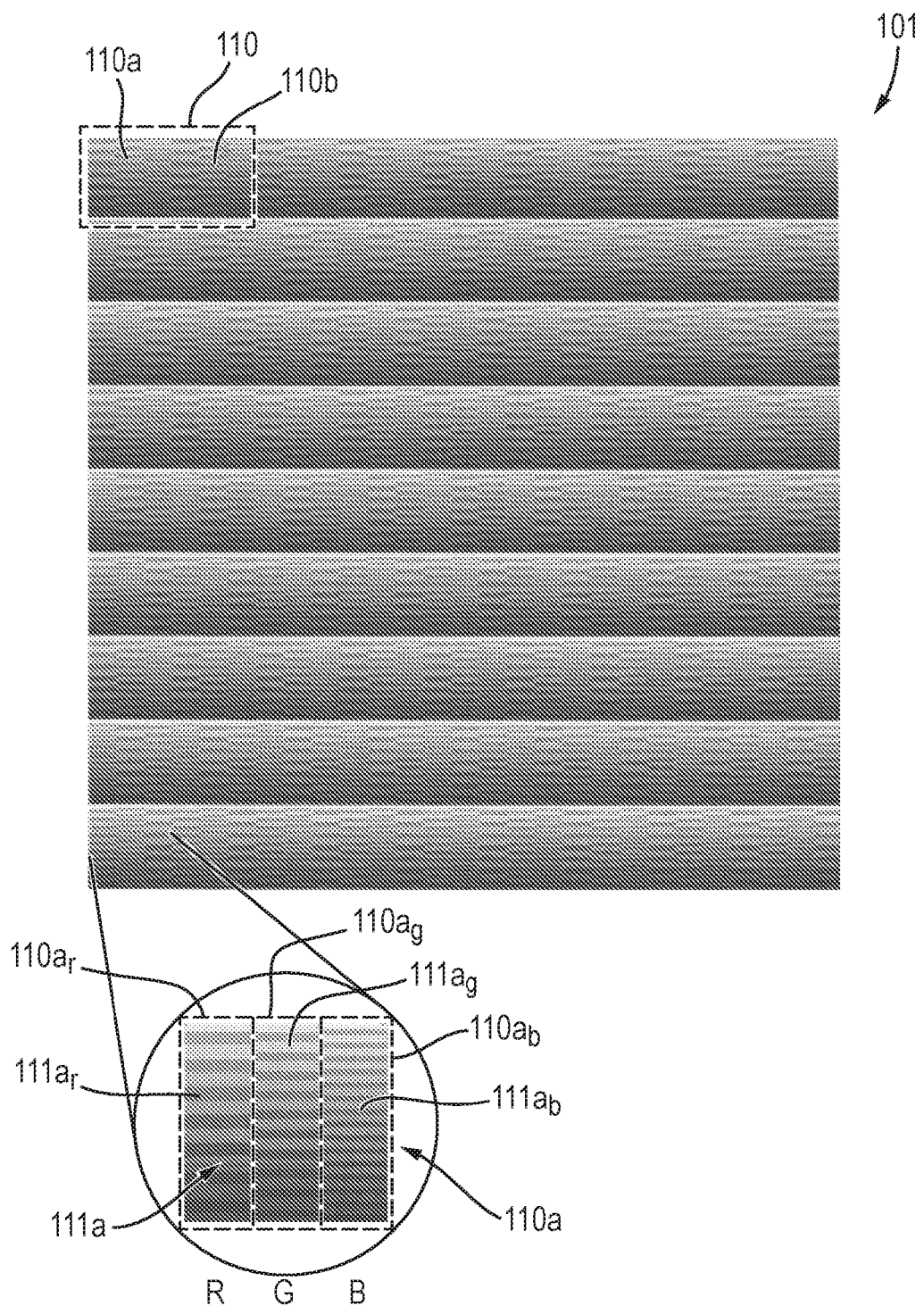

As noted above, the diffraction gratings are shown schematically in FIG. 10A as being provided uniformly across the image sub-regions; however, in practice more complex arrangements of diffraction gratings may be employed as desired in accordance with an image to be displayed. FIG. 10D shows in more detail one system for arranging the diffraction gratings. This Figure shows, in schematic plan view, the arrangement of image regions 110, formed of first and second image sub-regions 110a, 110b. One first image sub-region 110a is shown enlarged to illustrate the arrangement of the diffraction grating 111a. In the enlarged first image sub-region 110a, it can clearly be seen that the diffraction grating provided in each sub-region is broken down into three colour component areas. That is, this first image sub-region 110a has three colour component areas of equal size $110a_r$, $110a_g$, $110a_b$. The first colour component area $110a_r$ is designated to carry a diffraction grating $111a_r$ having a pitch and profile suitable for generating a red diffractive colour under standard viewing conditions, i.e. when viewed substantially at the normal to the first image sub-region 110a and illuminated from overhead. Similarly, the second colour component area $110a_g$ is designated to carry a diffraction grating $111a_g$ having a pitch and profile suitable for generating a green diffractive colour under standard viewing conditions and the third colour component area $110a_b$ is designated to carry a diffraction grating $111a_b$ having a pitch and profile suitable for generating a blue diffractive colour under standard viewing conditions. By providing each first image sub-region with these colour component areas and varying the coverage of the diffraction gratings within those colour component areas across the security device, a full colour image may be built up by the first image sub-regions 110a in combination when viewed at the appropriate horizontal viewing angle, i.e. corresponding to the plane of diffractive dispersion of the diffraction gratings, $111a_r$, $111a_g$, $111a_b$, as influenced by the average inclination of the first sub-regions 110a. By providing similar colour component areas within each second image sub-region 110b, a second full colour image may be produced that is visible from a second viewing angle, i.e. by rotating the security element about the vertical axis to align with the diffractive dispersion plane of the second diffraction gratings 111b.

FIG. 10D shows each colour component area $110a_r$, $110a_g$, $110a_b$ as being entirely filled with diffraction gratings; however, it should be appreciated that this is a schematic representation only. As noted above, each colour component area may be only partly filled with the corresponding diffraction grating, and some colour component areas may receive no diffraction gratings, depending on the desired colour of the pixel of the corresponding image that is to be produced by that particular image sub-region. For example, a red pixel may be produced by an image sub-region that has the red colour component area completely filled with the corresponding diffraction grating, while the green and blue colour component areas receive no diffraction grating. A whole range of colours may be produced for each pixel by tuning the RBG values in this way, i.e. by varying the coverage of the diffraction gratings within the colour component areas of each image sub-region.

In a particularly preferable implementation of the above embodiment, the first and second images may be configured as perspective-altered versions of the same image and the average inclinations of the sub-regions selected such that a stereoscopic image is visible to a viewer. For example, the first image sub-regions 110a may be arranged to diffract light towards a viewer's left eye, when held at a predetermined viewing distance, and the second image sub-regions 110b may be arranged to diffract light towards a viewer's right eye, when held at the same predetermined viewing distance, A further embodiment is shown in FIGS. 11A to 12B. This embodiment follows the same principles outline above with respect to FIGS. 10A to 100, but uses more than two image sub-regions in each image region 110 with different degrees of lateral tilt to produce more than two different images for display at different viewing angles along the horizontal direction, i.e. about the vertical axis.

Figure 11A:
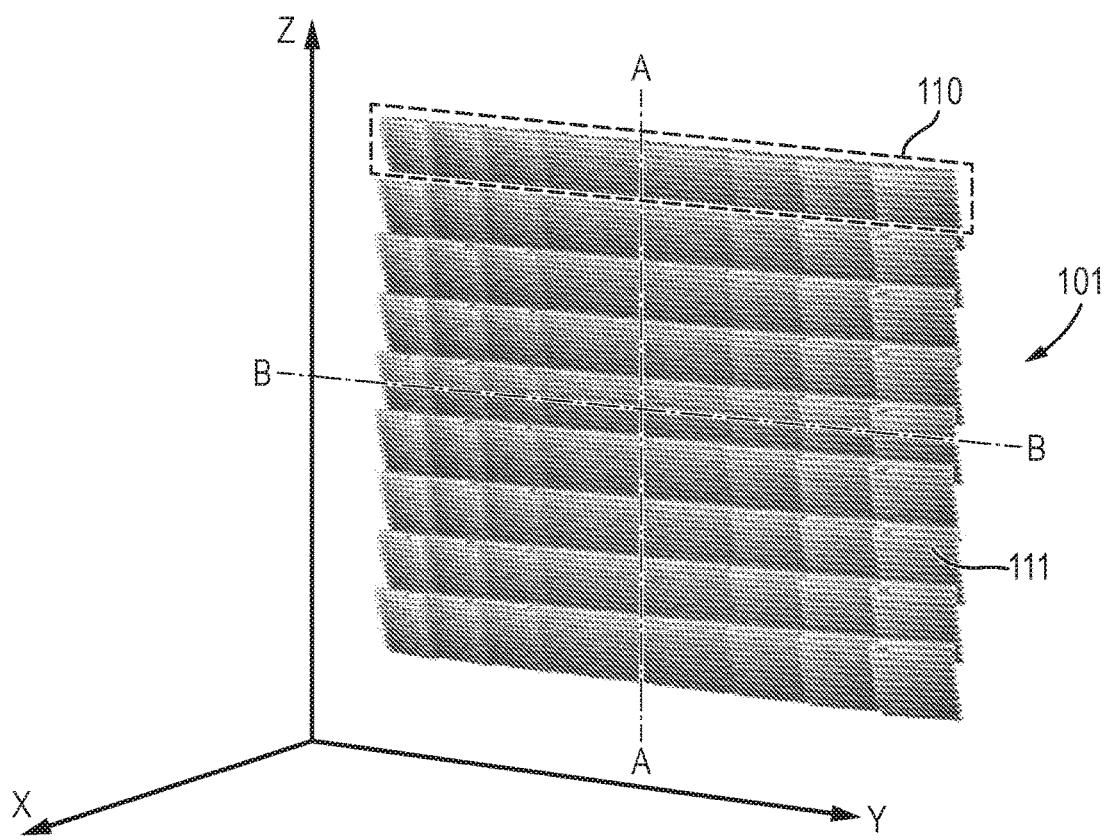
FIGS. 11A to 11C show, schematically, another embodiment of a security element in a perspective view, and first and second cross-sections respectively.

FIG. 11A shows only a part of the surface of the security element, and in particular shows an area that is only one image region wide, i.e. along horizontal direction B, and nine image regions tall, i.e. along the vertical direction A. However, it should be appreciated that, like the previous embodiment, the image regions 110 of the security element are arranged along a two-dimensional array, repeating along both the horizontal and vertical directions.

Figure 11B:
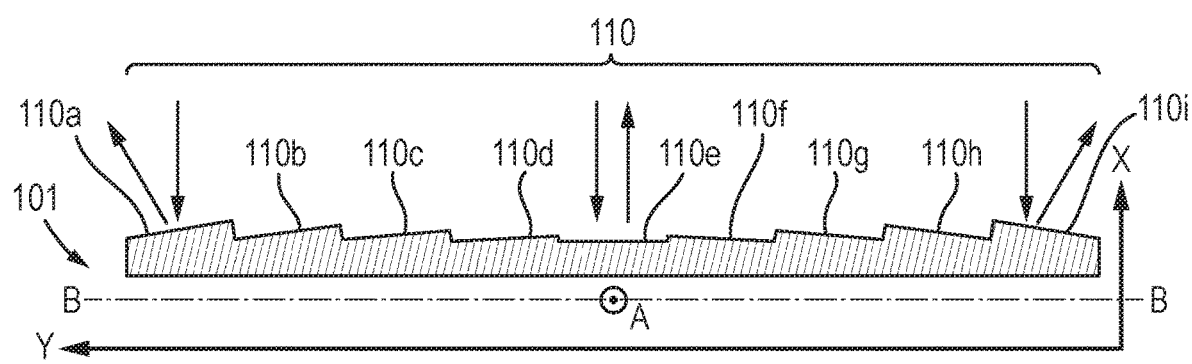
Figure 11C:
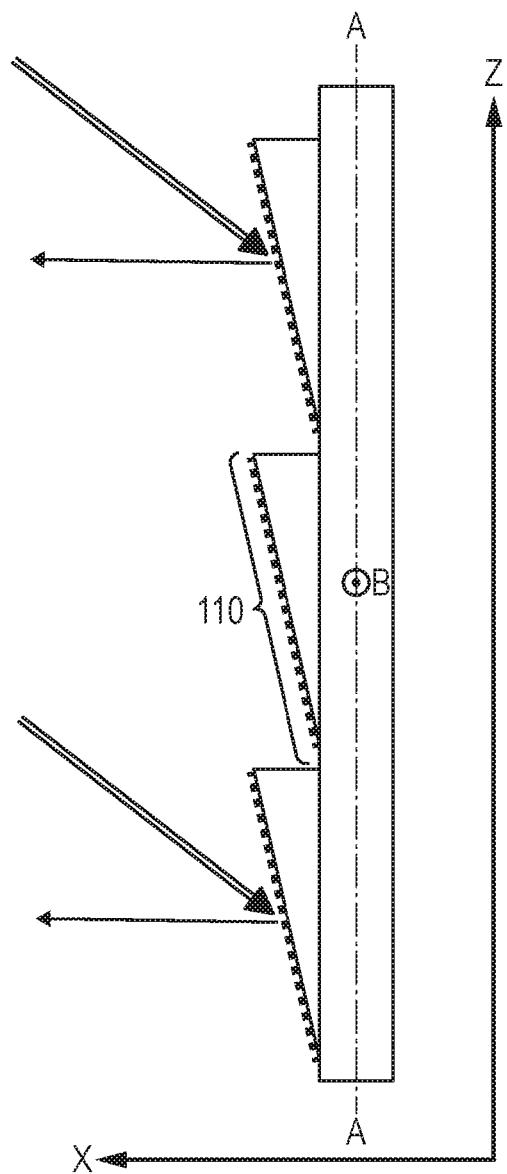

As shown most clearly in FIG. 11B, which is a horizontal cross-section through the part of the security element shown in FIG. 11A, i.e. through one image region 110, each image region 110 comprises nine image sub-regions 110a-110i. The nine image sub-regions are again generally square or rectangular in footprint and are arranged along the horizontal direction B, so that the sub-regions are effectively interlaced along the horizontal direction of the security element. Again, to ensure the spacing of the image sub-regions is not distinguishable by a viewer, the repeat distance of the image regions 110 along the horizontal direction, should be smaller than is perceivable by the naked eye. Furthermore, the image sub-regions are also provided with respective diffraction gratings 111a-111i, with the diffraction gratings again typically being modulated or arranged across the sets of image sub-regions in accordance with nine respective images. As with the previous embodiment, each of the diffraction gratings 111a-111i has the same orientation. That is, all grating elements extend along the direction B across the surface corresponding to the horizontal direction.

As can be seen from FIG. 11A, and as demonstrated in the vertical cross-section through three image regions 110 in FIG. 110, each of the nine image sub-regions has the same vertical tilt angle. That is, each image sub-region has an average inclination defining the same angle, relative to a plane of the security element 101, about an image region axis that extends along the horizontal direction B. However, each of the nine image sub-regions 110a-110i has a different degree of lateral tilt, i.e. their average inclinations define different angles relative to the plane of the security element about a vertical axis, i.e. an axis along the direction A. In particular, the first four image sub-regions 110a-110d are each inclined at different extents towards the viewers left, the central image sub-regions 110e has no lateral tilt either left or right, and the final four image sub-regions 110f-110i are each inclined at different extents towards the viewers right. Accordingly, a viewer may view nine different images in sequence by rotating the security element about the vertical axis so as to view the image produced by the modulation or arrangement of the associated diffraction grating 111a-111i.

Figure 11D:
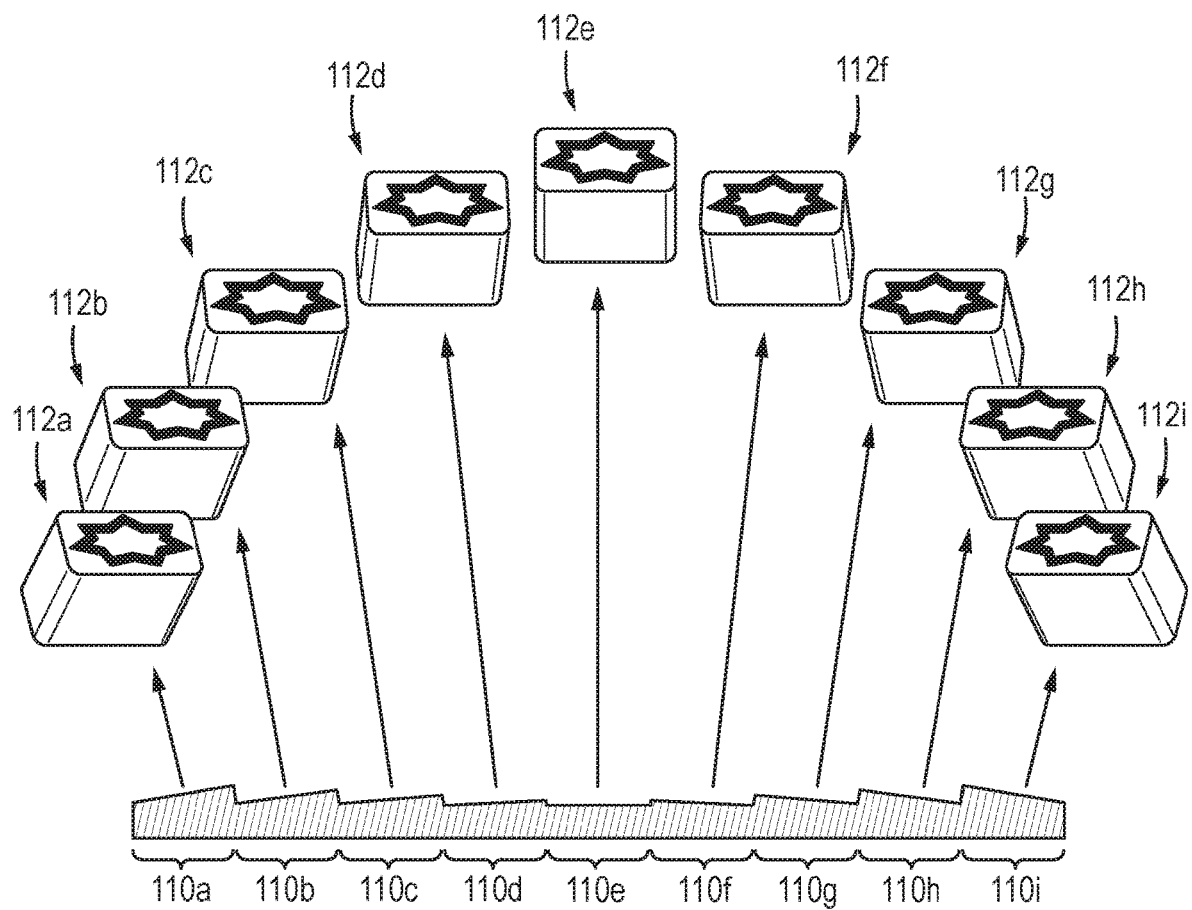
FIG. 11D illustrates the images produced by the security element.

FIG. 11D illustrates the images that may be generated by the structure shown in FIGS. 11A to 110. In particular, FIG. 11D shows nine images 112a-112i generated respectively by the sub-regions 110a-110i. It will be appreciated that each of the images 112a-112i is generated by the combined appearance of each of the respective set of image sub-regions. For example, the first image 112a is produced by the combined appearance of all first image sub-regions 110a across the complete array of image regions 110 when the device is oriented such that the diffractive structures in the first image sub-regions 110a exhibit their optical effect. In this embodiment, each first image sub-region 110a acts effectively as a pixel in the final image 112a. As the device is rotated about the vertical axis, the different images will become visible as the diffractive structures in the different sets of image sub-regions become active. FIG. 11D shows a preferred image set in which each image is a different perspective of the same object, in this case a cube. These perspective-altered versions of the cube may be matched to the viewing angles of the associated image sub-regions 110a-110i such that rotation of the security element about its vertical axis produces a similar rotation of the cube shown in the images. This can provide a three dimensional appearance to the security element and thereby provide a visually striking and easily recognisable effect.

Figure 12A:
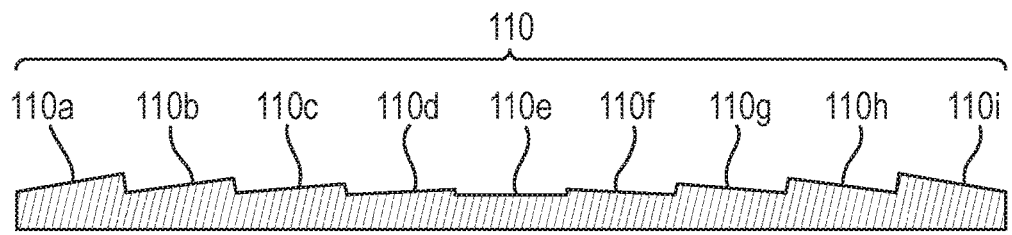
FIGS. 12A to 12C show, schematically, a cross-section through the embodiment of FIG. 11, the arrangement of the image sub-regions of the embodiment of FIG. 11 and an alternative arrangement of image sub-regions according to a variant of the FIG. 11 embodiment.
Figure 12B:
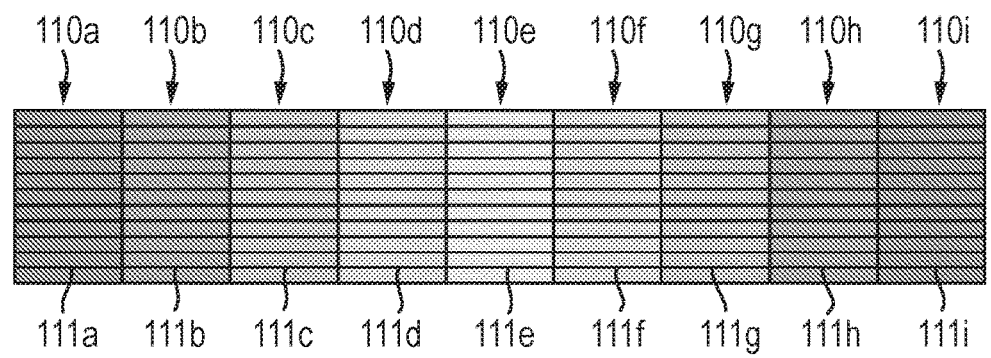
Figure 12C:
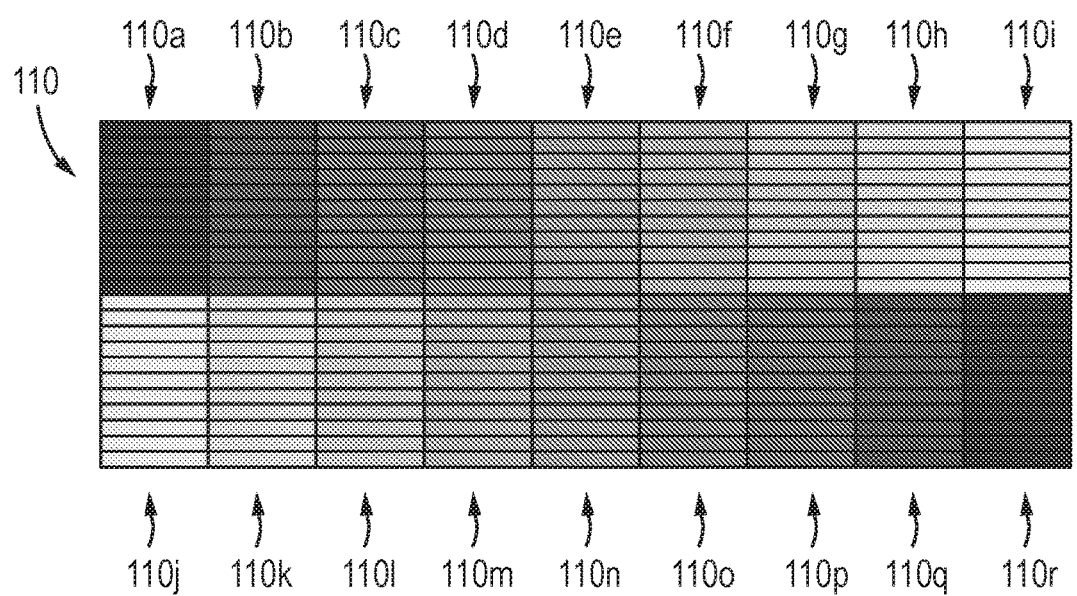

FIGS. 12A and 12B show more clearly the arrangement of the image sub-regions 110a-110i within one image region 110. As can be seen here, the nine image sub-regions are arranged in one row along the width of the security element. It is desirable to provide many images so that the security element exhibits a high degree of optical variability and this is provided by increasing the number of image sub-regions with different inclinations in the left-right direction. A problem that occurs as you increase the number of image sub-regions arranged in a single row is that the sub-regions must either be made very narrow and hence lose diffractive brightness, or the repeat distance of the image regions along the horizontal direction must be increased, in which case the individual image regions may become visible to the naked eye. FIG. 12C shows an alternative arrangement to that shown in FIGS. 11A to 12C which increases the number of image sub-regions to 18, thereby increasing the number of independent images to 18, without increasing the width of an image region and without making the image sub-regions narrower.

As shown in FIG. 12C, an individual image region 110 may be formed with a two-dimensional array of image sub-regions, rather than a single row of image sub-regions. As mentioned, in this variant, 18 image sub-regions 110a-110r are used, arranged this time in two rows of nine. Again, each individual image sub-region has the same forward tilt, as described above, to provide the advantages of the invention related to the change in the position of the diffractive orders. As with the previous embodiment, each sub-region additionally has a different degree of left-right tilt, such that each sub-region will have its plane of diffractive dispersion at a separate viewing angle along the horizontal direction. In this embodiment, all of the image sub-regions 110a-110i in the upper row tilt with differing amounts towards the viewer's left, while all of the of the image sub-regions 110j-110r in the lower row tilt with differing amounts towards the viewer's right. In the top row, the degree of tilt of the image sub-regions 110a-110i towards the viewer's left decreases from left to right along the row. Similarly, in the bottom row, the degree of tilt of the image sub-regions 110j-110r towards the viewer's right increases from left to right along the row. While this arrangement of image sub-regions is used in the present embodiment, it should be noted that there is no requirement for any particular order of the sub-regions within an image region, or for the order to be the same from one image region to the next. When the viewer views a security element having the arrangement shown in FIG. 12C, a different one of the 18 images will be visible as the viewer rotates the security element about the vertical axis.

The above embodiments have used substantially planar image sub-regions; however, an embodiment will now be described that uses convex image sub-regions.

Figure 13A:
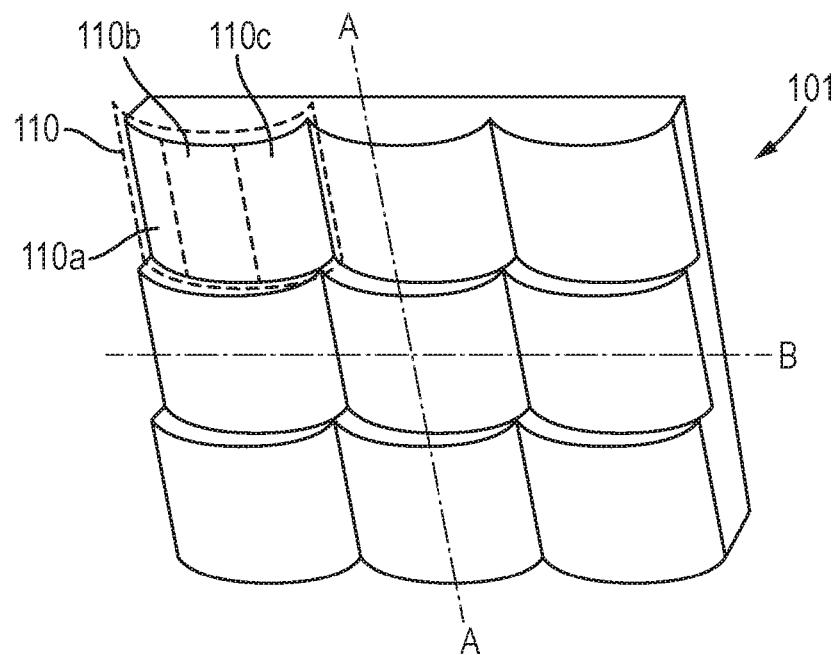
FIGS. 13A to 13C show, schematically, another embodiment of a security element in a perspective view, and first and second cross-sections respectively.

FIG. 13A shows, schematically, part of the surface of the security element 101 in a front view. Here a two-dimensional array of image regions 110 are shown, with, specifically, a three-by-three portion show in this Figure; however, again, it will be appreciated that the full security element will typically include a much larger array of image regions. Each image region 110 comprises an identically shaped semi-cylindrical surface element portion. In each image region, the semi-cylindrical surface element is arranged so that the image region is convex along the horizontal direction, i.e. direction B in the Figures. This also means that each image region 110 is not convex along the vertical direction, i.e. direction A in the Figures. This can be more clearly seen in the cross-sections of FIGS. 13B and 13C, which are horizontal and vertical cross-sections respectively. As can be seen in FIGS. 13A and 13C, each semi-cylindrical surface element is tilted forwards, i.e. the top of the image region 110 will be generally closer to the viewer than the bottom of the image region when the viewer views the security element generally perpendicular to the plane of the security element.

Each image region 110 is divided into three image sub-regions 110a, 110b, 110c, which are each a region of the semi-cylindrical surface element portion. In particular, the three image sub-regions 110a, 110b, 110c each extend the full height of the image region 110 and are arranged along the horizontal direction such that they have approximately one-third of the width of the image region 110. Each image sub-region thereby has a different average inclination. In particular, the first image sub-region 110a, on the left side of the image region, has an average inclination that is tilted forwards and towards the viewer's left, the second image sub-region 110b, in the middle of the image region 100, has an average inclination that is tilted forwards, and the third image sub-region 110c, on the right side of the image region, has an average inclination that is tilted forwards and towards the viewer's right. As with the above embodiments, each of these image sub-regions carries respective diffraction gratings modulated or arranged in accordance with a respective first to third image; however, the gratings are omitted from FIG. 13A for clarity. As with the above embodiments, the gratings should be oriented within 45° of the horizontal and preferably along the horizontal.

Figure 13B:
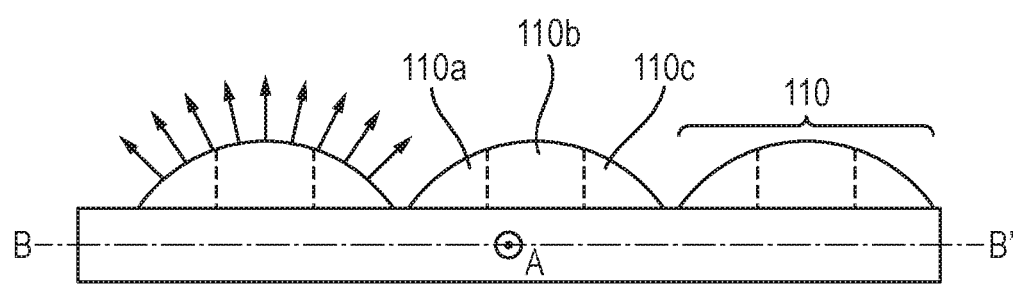
Figure 13C:
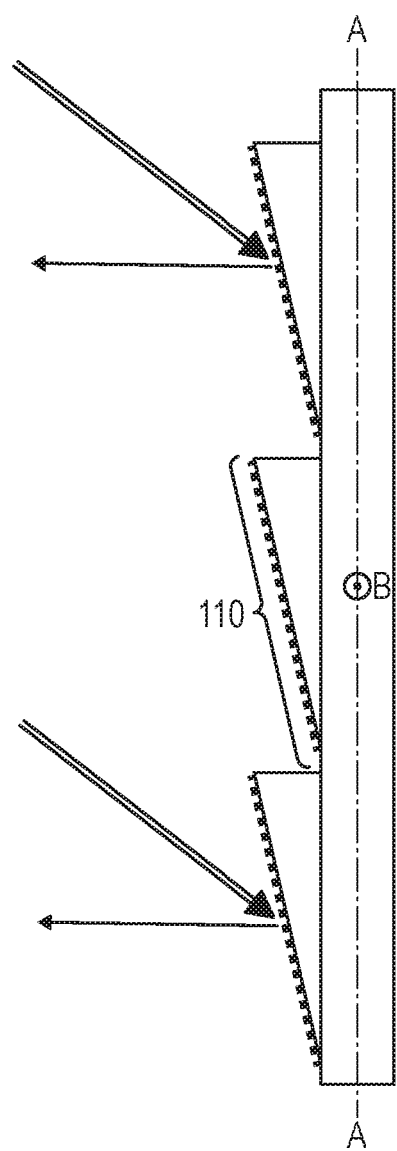

Since the image region 110 is generally convex along the horizontal direction, each individual image sub-region 110a, 110b, 110c will also be convex along the horizontal direction, as shown clearly in the horizontal cross-section of FIG. 13B. Having convex, rather than planar, image sub-regions provides that the sub-regions act to guide incident light along a range of angles in the horizontal direction, i.e. light diffracted from the left side of the sub-region will be diffracted along a slightly different lateral direction than light from the right side of the sub-region. This can prevent harsh image switches from being exhibited as the viewer rotates the security element about its vertical axis. This embodiment can be advantageously employed in combination with the colour component areas, for example, by arranging the different colour component areas along the vertical direction, rather than the horizontal direction, such that the convex nature of the sub-region does not impact the replay of the colour components in combination.

In all of the above embodiments, the security element has been configured for viewing by rotation about the vertical axis to cycle between images. This has meant that each image sub-region has had substantially the same forward inclination, i.e. has defined substantially the same angle, relative to a plane of the security element, about an image region axis that extends along the horizontal direction, for providing that the images are visible at the same vertical viewing angle. However, this is not essential and some embodiments may comprise one or more image sub-regions that have different degrees of forward tilt for providing optical variability in rotation about a horizontal axis. Such an embodiment will now be described with reference to FIGS. 14A and 14B.

Figure 14A:
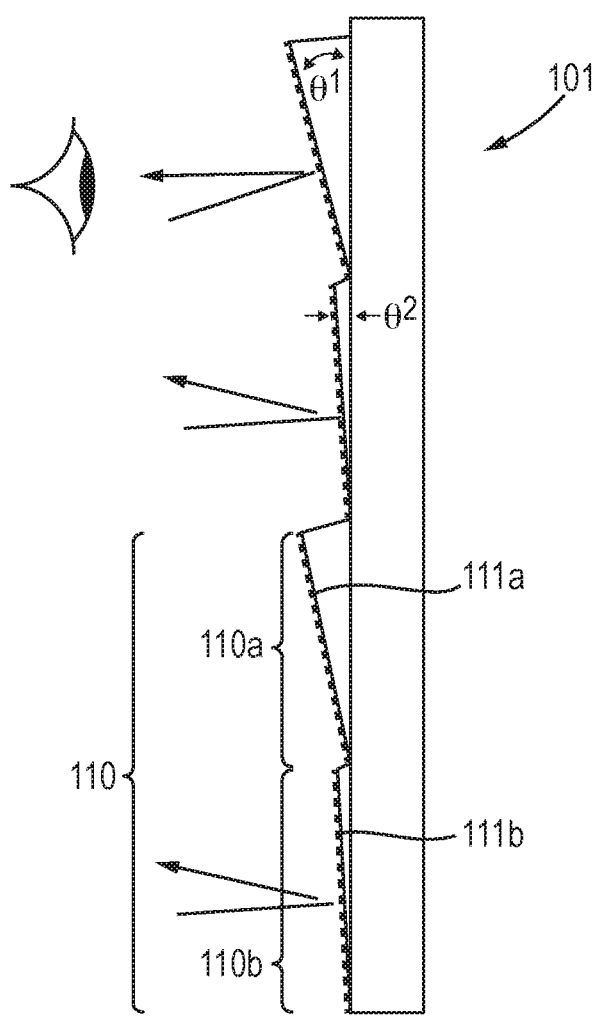
FIGS. 14A and 14B show, schematically, another embodiment of a security angle under two different viewing arrangements.
Figure 14B:
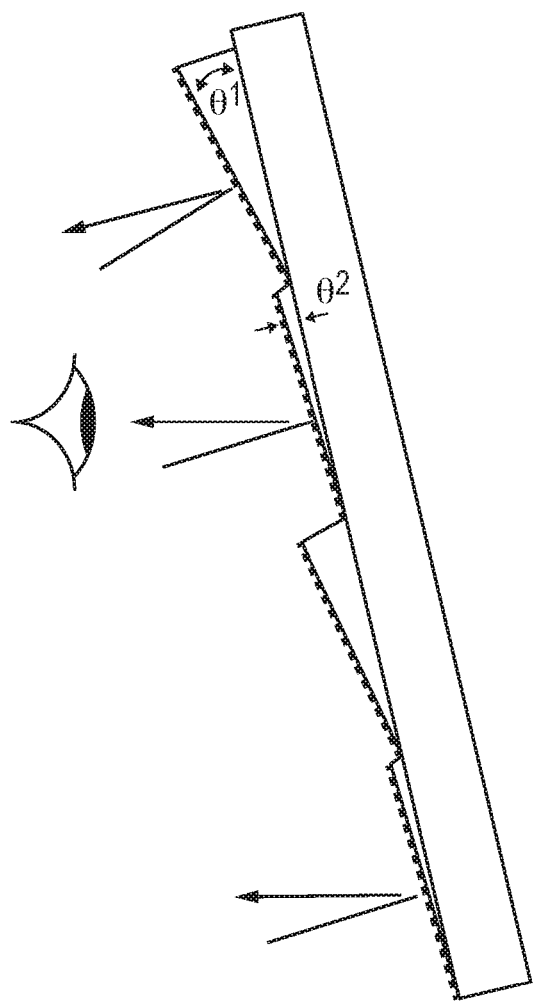

The embodiment of FIGS. 14A and 14B comprises an array of elongate image regions 110, extending along the full width of the security element along a horizontal direction and repeating along the vertical direction of the element, substantially as described above with respect to FIGS. 2 to 4. This embodiment differs, however, in that each elongate image region 110 is divided into two image sub-regions 110a, 110b. Specifically, the upper half of each image region 110 forms a first image sub-region 110a and the lower half of each image region 110 forms a second image sub-region 110b, such that both sets of sub-regions extend along the full width of the security element.

The first image sub-regions 110a each have an average inclination defining a first angle $\theta^1$, relative to a plane of the security element 101, about an image region axis that extends along the horizontal. That is, the top of each first image sub-region is inclined towards a viewer such that, when the security element is viewed by a viewer along a direction normal to the plane of the security element, the top of each first image sub-region 110a is closer to the viewer than the bottom of the corresponding first image sub-region 110a. The second image sub-regions 110b have a different forward tilt to the first image sub-regions. That is, the second image sub-regions 110b each have an average inclination defining a second angle $\theta^2$, relative to a plane of the security element 101, about an image region axis that extends along the horizontal. In this case, the second image sub-regions 110b have a shallower forward tilt than the first image sub-regions.

As with the above embodiments, diffraction gratings 111a and 111b are provided respectively across the first and second image sub-regions, and are modulated or arranged in accordance with respective first and second images. In this embodiment, both sets of gratings are nano-gratings, i.e. a grating having a pitch of 600 nm or less, arranged with the grating elements extending substantially horizontally such that the diffraction plane is substantially vertical. As has been described above, the first diffraction order for such grating is far removed from the direction of specular reflection. However, the forward tilt of the image sub-regions provides that this first diffraction order is visible, when illuminated from overhead, at an angle closer to perpendicular to the plane of the security device. In this embodiment, since the first and second sub-regions have different degrees of forward tilt, the first diffraction orders will be visible at different vertical viewing angles. A viewer may therefore switch between the first image, generated by the first diffraction order of the diffraction gratings 111a across the first image sub-regions in combination, and the second image, generated by the first diffraction order of the diffraction gratings 111b across the second image sub-regions in combination, by tilting the device about a horizontal axis.

While this embodiment shows the use of different degrees of forward tilt without any lateral tilt of the image sub-regions, it will be appreciated that these techniques can be combined. Such an example will now be described with reference to FIGS. 15A to 15D.

Figure 15A:
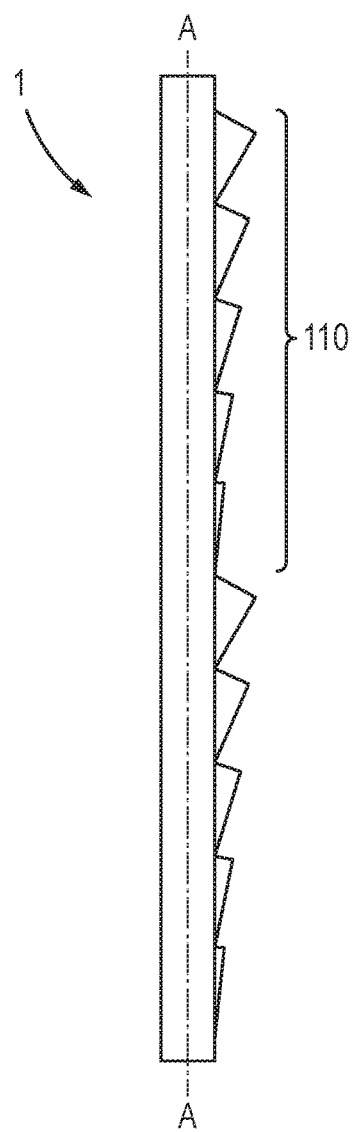
FIGS. 15A to 15C show, schematically, another embodiment of a security element in first and second cross-sections, a plan view of part of the security element respectively.
Figure 15B:
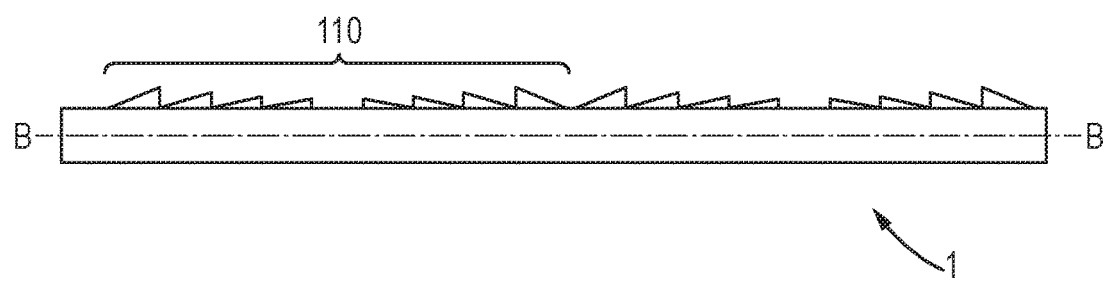
Figure 15C:
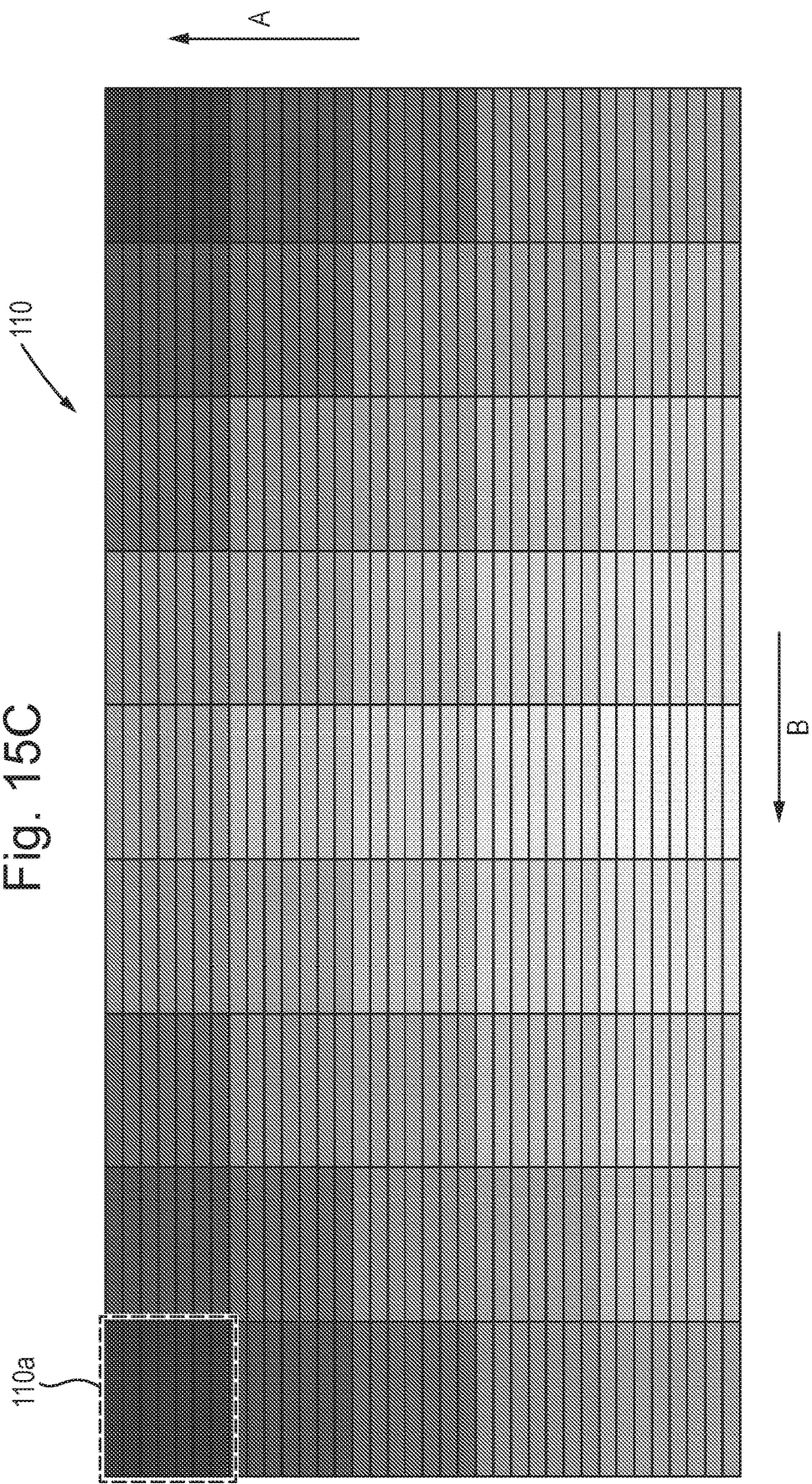

FIG. 15A shows a vertical cross section of part of a security element. In this Figure, two image regions 110 are shown; however, as with all of the above embodiments, it will be appreciated that many more are typically used in practice. FIG. 15B shows a horizontal cross-section of the security element, again showing only two image regions 110. FIG. 15C shows, in schematic plan view, a single image region 110, illustrating that this is formed by a two-dimensional array of image sub-regions with varying inclinations. In this case, each image region is nine sub-regions wide (i.e. along the direction B) and five sub-regions high (i.e. along the direction A), for a total of 45 sub-regions, only the first of which, sub-region 110a, is labelled in FIG. 15C for clarity.

FIG. 15A illustrates that, within each image region 110, each row of sub-regions has a different degree of forward tilt. The uppermost row of sub-regions along the direction A has the greatest forward tilt, while the lowermost row of sub-regions along direction A has the least forward tilt, with the rows in between having corresponding intermediate forward tilts. FIG. 15B shows that the sub-regions also vary in their lateral tilt, i.e. left-right tilt. This Figure shows that the left-most column of sub-regions has the greatest inclination towards the viewer's left, while the right-most column of sub-regions has the greatest inclination towards the viewer's right, with the columns in between having corresponding intermediate lateral tilts. The result is that each of the 45 different sub-regions will have a unique inclination angle, made up of varying degrees of forward and lateral tilt. FIG. 15C illustrates the degree of inclination across the image region; those sub-regions on either end of the upper row being the most inclined, as they exhibit strong forward tilt and strong lateral tilt, and the sub-region in the centre of the lowermost row being the least inclined, exhibiting no lateral tilt and only a shallow forward tilt.

As shown in FIG. 15C, the diffraction gratings provided across the 45 sub-regions are arranged such that the grating elements extend along the horizontal such that the plane of diffractive dispersion in each sub-region is vertical. The different degrees of lateral tilt of the sub-regions will control which of the columns of sub-regions is arranged so that the diffractive dispersion planes are aligned with the viewer's direction, as the security element is rotated about its vertical axis. Meanwhile, the different degrees of forward tilt will control which row of sub-regions is arranged such that the first diffraction order of the corresponding diffraction gratings is arranged with the viewer's direction, as the security element is rotated about the horizontal axis. The combination of the lateral tilt to control the left-right viewing angle and the forward tilt to control the vertical viewing angle will provide that each sub-region has at least one viewing angle at which its diffractive effect is displayed to a viewer.

FIG. 15D illustrates the how rotation of the security element 1 about the horizontal axis B changes which row of sub-regions exhibits its first diffractive order in the horizontal plane for viewing by an appropriately positioned viewer. This Figure shows the security element at five different stages during rotation about the horizontal axis B. The leftmost instance shows the security element 1 steeply inclined towards the viewer such that the lowermost row of sub-regions, with the shallowest forward inclination, is exhibiting its first diffraction order in the horizontal plane. The rightmost instance shows the security element arranged substantially vertically, i.e. such that a horizontal viewing direction is substantially perpendicular to the plane of the security element. In this arrangement, the uppermost row of sub-regions, with the steepest forward inclination, is exhibiting its first diffraction order in the horizontal plane. The intermediate viewing instances correspond to intermediate arrangements of the security element and in each case a different one of the rows of security elements will exhibit its first diffraction order in the horizontal plane, depending on the degree of forward tilt of the sub-regions.

What is not shown in FIG. 15D is that for each of these viewing positions about the horizontal axis, corresponding to one of the rows of sub-regions, nine different images may be viewed in sequence by rotating the security element about the vertical axis so as to arrange the sub-regions according to their different lateral tilts such that their corresponding images are visible. This can be considered substantially identical to the mechanism described above with respect to FIGS. 11A to 11D, which exhibits these image switches only in the horizontal direction.

Security elements of the sorts described above are suitable for forming on security articles such as threads, stripes, patches, foils and the like which can then be incorporated into or applied onto security documents such as banknotes. The security elements can also be constructed directly on security documents, such as polymer banknotes.

Security elements of the sorts described above can be incorporated into or applied to any product for which an authenticity check is desirable. In particular, such devices may be applied to or incorporated into documents of value such as banknotes, passports, driving licenses, cheques, identification cards etc. The security element can either be formed directly on the security document (e.g. on a polymer substrate forming the basis of the security document) or may be supplied as part of a security article, such as a security thread or patch, which can then be applied to or incorporated into such a document. The security element may be applied to a security document, for example by using a pressure sensitive adhesive.

Such security articles can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travelers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP 0059056 A1. EP 0860298 A2 and WO 03095188 A2 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

Base substrates suitable for making security substrates for security documents may be formed from any conventional materials, including paper and polymer. Techniques are known in the art for forming substantially transparent regions in each of these types of substrate. For example, WO 8300659 A1 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security element or a separate security element can be applied to the transparent substrate of the document. WO 0039391 A1 describes a method of making a transparent region in a paper substrate.

The security element may also be applied to one side of a paper substrate, optionally so that portions are located in an aperture formed in the paper substrate. An example of a method of producing such an aperture can be found in WO 03054297 A2. An alternative method of incorporating a security element which is visible in apertures in one side of a paper substrate and wholly exposed on the other side of the paper substrate can be found in WO 2000/39391 A1.

The security element of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Particularly in embodiments in which the diffractive relief structures are metallised, e.g. in which the diffraction gratings are coated in an opaque metal layer, the security element can be used to conceal the presence of a machine readable dark magnetic layer, for example, provided between the curable material and the transparent support in the embodiment of FIG. 19. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

The invention claimed is:

1. A security element comprising:
   a first layer having a first surface extending along a first direction and a second direction;
   an array of image regions across the first surface arranged along at least the second direction, each image region comprising at least a first image sub-region having an average inclination defining an angle, relative to a plane of the security element, about an image region axis extending along the first direction;
   a diffractive optically variable effect generating structure provided in or on the first surface across the first image sub-regions, the diffractive optically variable effect generating structure comprising diffractive elements that extend along a direction within 45° of the first direction,
   wherein the diffractive optically variable effect generating structure is provided across the first image sub-regions and spatially arranged and/or modulated across the first image sub-regions in accordance with a first image such that the first image is displayed by the first image sub-regions in combination at least at a first viewing angle,
   wherein each image region further comprises at least a second image sub-region having an average inclination defining an angle, relative to the plane of the security element, about the image region axis extending along the first direction, and
   wherein the diffractive optically variable effect generating structure is provided across the second image sub-regions and spatially arranged and/or modulated across the second image sub-regions in accordance with a second image such that the second image, preferably different from the first image, is displayed by the second image sub-regions in combination at least at a second viewing angle, different from the first viewing angle.

2. A security element according to claim 1, wherein the first direction is substantially perpendicular to the second direction.

3. A security element according to claim 1, wherein the diffractive optically variable effect generating structure is a dispersive structure.

4. A security element according to claim 1, wherein the diffractive optically variable effect generating structure has a pitch of 600 nm or less.

5. A security element according to claim 1, wherein each first image sub-region has substantially the same average inclination relative to the plane of the security element.

6. A security element according to claim 1, wherein the diffractive optically variable effect generating structure varies in one or more of a pitch, an orientation and a size, a shape and/or a profile of the elements of the structure across the first image sub-regions so as to define different areas of the first image.

7. A security element according to claim 1, wherein each first and second image sub-region define an angle, relative to the plane of the security element, in the same direction about the image region axis extending along the first direction.

8. A security element according to claim 1, wherein each first and second image sub-region within each image region have substantially the same average inclination.

9. A security element according to claim 8, wherein the diffractive optically variable effect generating structure provided across the second image sub-regions differs from the diffractive optically variable effect generating structure provided across the first image sub-regions in at least one of a pitch of the structure, an orientation of the structure and a size, a shape and/or a profile of the elements of the structure such that the second viewing angle is different from the first viewing angle.

10. A security element according to claim 1, wherein each first image sub-region has a different average inclination from a corresponding second image sub-region within each image region.

11. A security element according to claim 10, wherein each first image sub-region defines a different angle, relative to a plane of the security element, about a second image region axis extending along the second direction than is defined by the corresponding second image sub-region within each image region, such that the second viewing angle is different from the first viewing angle.

12. A security element according to claim 1, wherein each first image sub-region defines a different angle, relative to a plane of the security element, about the image region axis extending along the first direction than is defined by a corresponding second image sub-region within each image region, such that the second viewing angle is different from the first viewing angle.

13. A security element according to claim 1, wherein the array of image regions defines an array of interlaced image sub-regions, the interlaced image sub-regions being interlaced at least along the second direction.

14. A security element according to claim 1, wherein the image regions define a two-dimensional array of image regions across the first surface.

15. A security element comprising:
   a first layer having a first surface extending along a first direction and a second direction;
   an array of image regions across the first surface arranged along at least the second direction, each image region comprising at least a first image sub-region having an average inclination defining an angle, relative to a plane of the security element, about an image region axis extending along the first direction;
   a diffractive optically variable effect generating structure provided in or on the first surface across the first image sub-regions, the diffractive optically variable effect generating structure comprising diffractive elements that extend along a direction within 45° of the first direction, wherein the diffractive optically variable effect generating structure is provided across the first image sub-regions and spatially arranged and/or modulated across the first image sub-regions in accordance with a first image such that the first image is displayed by the first image sub-regions in combination at least at a first viewing angle, wherein the image regions define a two-dimensional array of image regions across the first surface, and wherein each sub-region within each image region defines a pixel of a corresponding image exhibited at a corresponding viewing angle.

16. A security element comprising:
a first layer having a first surface extending along a first direction and a second direction;
an array of image regions across the first surface arranged along at least the second direction, each image region comprising at least a first image sub-region having an average inclination defining an angle, relative to a plane of the security element, about an image region axis extending along the first direction;
a diffractive optically variable effect generating structure provided in or on the first surface across the first image sub-regions, the diffractive optically variable effect generating structure comprising diffractive elements that extend along a direction within 45° of the first direction,
wherein the diffractive optically variable effect generating structure is provided across the first image sub-regions and spatially arranged and/or modulated across the first image sub-regions in accordance with a first image such that the first image is displayed by the first image sub-regions in combination at least at a first viewing angle,
wherein the array of first image sub-regions comprises an array of primary areas and an array of secondary areas,
wherein the diffractive optically variable effect generating structure comprises a primary diffractive optically variable effect generating structure provided across the primary areas and a secondary diffractive optically variable effect generating structure provided across the secondary areas, and
wherein the primary diffractive optically variable effect generating structure differs from the secondary diffractive optically variable effect generating structure in at least one of a pitch of the structure, an orientation of the structure and a size, a shape and/or a profile of the elements of the structure such that the primary and secondary areas appear different at least at the first viewing angle.

17. A security element according to claim 16, wherein the primary diffractive optically variable effect generating structure differs from the secondary diffractive optically variable effect generating structure in at least one of the pitch of the structure, the orientation of the structure and the size, the shape and/or the profile of the elements of the structure such that the primary diffractive optically variable effect generating structure and the secondary diffractive optically variable effect generating structure exhibit their diffractive effects at different viewing angles.

18. A security element comprising:
a first layer having a first surface extending along a first direction and a second direction;
an array of image regions across the first surface arranged along at least the second direction, each image region comprising at least a first image sub-region having an average inclination defining an angle, relative to a plane of the security element, about an image region axis extending along the first direction;
a diffractive optically variable effect generating structure provided in or on the first surface across the first image sub-regions, the diffractive optically variable effect generating structure comprising diffractive elements that extend along a direction within 45° of the first direction,
wherein the diffractive optically variable effect generating structure is provided across the first image sub-regions and spatially arranged and/or modulated across the first image sub-regions in accordance with a first image such that the first image is displayed by the first image sub-regions in combination at least at a first viewing angle, and
wherein the or each sub-region within each image region has an average inclination that defines an angle of between 1° and 70° relative to the plane of the security element, about the image region axis extending along the first direction.

* * * * *